US008600245B2

(12) United States Patent
Miyagi

(10) Patent No.: US 8,600,245 B2
(45) Date of Patent: Dec. 3, 2013

(54) IMAGE FORMING APPARATUS, IMAGE FORMING METHOD, AND PROGRAM GENERATING A PATCH IMAGE

(75) Inventor: Noriko Miyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 287 days.

(21) Appl. No.: 13/064,068

(22) Filed: Mar. 4, 2011

(65) Prior Publication Data

US 2011/0222870 A1 Sep. 15, 2011

(30) Foreign Application Priority Data

Mar. 12, 2010 (JP) ................................ 2010-056211
Jan. 31, 2011 (JP) ................................ 2011-019029

(51) Int. Cl.
*H04N 1/60* (2006.01)

(52) U.S. Cl.
USPC ........................................................ 399/15

(58) Field of Classification Search
USPC ...................................... 399/15, 49, 38, 72
See application file for complete search history.

(56) References Cited

U.S. PATENT DOCUMENTS

| | | | | |
|---|---|---|---|---|
| 6,198,896 | B1 * | 3/2001 | Nakayasu et al. | 399/301 |
| 7,327,874 | B2 | 2/2008 | Shibaki et al. | |
| 7,356,160 | B2 | 4/2008 | Shibaki et al. | |
| 7,403,310 | B2 | 7/2008 | Miyagi et al. | |
| 7,466,453 | B2 | 12/2008 | Miyagi et al. | |
| 7,486,829 | B2 | 2/2009 | Miyagi et al. | |
| 7,535,595 | B2 | 5/2009 | Miyagi et al. | |
| 7,667,711 | B2 | 2/2010 | Miyagi | |
| 2004/0165081 | A1 | 8/2004 | Shibaki et al. | |
| 2004/0257622 | A1 | 12/2004 | Shibaki et al. | |
| 2005/0018258 | A1 | 1/2005 | Miyagi et al. | |
| 2005/0018903 | A1 | 1/2005 | Miyagi et al. | |
| 2006/0187246 | A1 | 8/2006 | Miyagi | |
| 2006/0256123 | A1 | 11/2006 | Miyagi | |
| 2007/0206228 | A1 | 9/2007 | Miyagi | |
| 2008/0144975 | A1 | 6/2008 | Shibaki et al. | |
| 2009/0034002 | A1 | 2/2009 | Shibaki et al. | |

(Continued)

FOREIGN PATENT DOCUMENTS

| | | |
|---|---|---|
| JP | 3926698 | 6/2007 |
| JP | 2007264364 A | 10/2007 |
| JP | 2010-134366 A | 6/2010 |

OTHER PUBLICATIONS

Computer translation of JP2007-264364A to Suzuki, Oct. 2007.*

*Primary Examiner* — Quana M Grainger
(74) *Attorney, Agent, or Firm* — Harness, Dickey & Pierce, P.L.C.

(57) ABSTRACT

An image forming apparatus includes: a patch-image generating unit that generates a patch image for measuring a color reproduction characteristic and correcting color, the patch image including mixed-color patch sets each including a plurality of patches each formed by overlaying a plurality of color materials so that patches having the same color and the same tone value included in the mixed-color patch sets are arranged away from each other in a circumferential direction of a photosensitive element and a distance between same tone patches, which are two patches having the same color and the same tone value, is close to (N+½) times the length of a period of uneven density which periodically occurs in the circumferential direction of the photosensitive element (N is an integer equal to or greater than 0); and an image forming unit that forms the generated patch image on a recording medium.

7 Claims, 16 Drawing Sheets

(56) References Cited

U.S. PATENT DOCUMENTS

| | | | | |
|---|---|---|---|---|
| 2009/0147313 | A1 | 6/2009 | Miyagi et al. | |
| 2009/0180164 | A1 | 7/2009 | Miyagi | |
| 2009/0213429 | A1 | 8/2009 | Miyagi | |
| 2009/0263150 | A1 * | 10/2009 | Fujimori et al. | 399/49 |
| 2010/0027038 | A1 | 2/2010 | Miyagi | |
| 2010/0157112 | A1 | 6/2010 | Miyagi | |

* cited by examiner

IMAGE FORMING APPARATUS, IMAGE FORMING METHOD, AND PROGRAM GENERATING A PATCH IMAGE

CROSS-REFERENCE TO RELATED APPLICATIONS

The present application claims priority to and incorporates by reference the entire contents of Japanese Patent Application No. 2010-056211 filed in Japan on Mar. 12, 2010 and Japanese Patent Application No. 2011-019029 filed in Japan on Jan. 31, 2011.

BACKGROUND OF THE INVENTION

1. Field of the Invention

The present invention relates to an image forming apparatus, an image forming method, and a program.

2. Description of the Related Art

Conventionally, it is well-known that on an image formed by an image forming apparatus, such as a color printer or a color multifunction peripheral (MFP), periodic uneven density occurs in a sub-scanning direction on the page in accordance with the circumferential length of a photosensitive drum. To suppress the effect of such uneven density in the sub-scanning direction, there is already known a technology to output a patch image in which respective same tone patches in cyan (C), magenta (M), yellow (Y), and black (K) colors are staggered by a distance corresponding to half the length of a period of uneven density in two positions in the sub-scanning direction at the time of calibration, and to create a tone correction table on the basis of an average value of colorimetric values of each color, thereby offsetting the uneven density and setting a tone correction table is unaffected by the effect of uneven density.

For example, in a technology disclosed in Japanese Patent Application Laid-open No. 2007-264364, there is achieved a method of adjusting the density by patch formation taking into account periodic uneven density caused by a fluctuation in the rotating speed of an image carrier and the like. Specifically, Japanese Patent Application Laid-open No. 2007-264364 discloses an image forming apparatus which generates patches with the same color and the same density and tone value in two positions kept at a predetermined distance (a distance corresponding to half the length of the period of uneven density or the like) in a circumferential direction of an image carrier, measures the density of each of the patches generated in the two positions, and generates information for a density correction process on the basis of the measured densities (for example, an average value of two densities).

However, the conventional technology to stagger patches with the same tone by a distance corresponding to half the length of the period of uneven density in the two positions in the sub-scanning direction is intended for single-color calibration, and is not particularly considered for mixed-color calibration.

Even when a calibration process is performed so that primary colors (C, M, Y, K) meet respective target values, a secondary color and a tertiary color may not be stably output in the same color; so, the necessity for mixed-color calibration is required. Namely, because most of colors contained in a natural image are mixed colors, an image forming apparatus is required to perform mixed-color calibration so as to stably output mixed color in the same color constantly.

In the mixed-color calibration, a single-color patch formed of a single color material only as well as a mixed-color patch formed by overlaying a plurality of color materials are output, and a tone correction table is created on the basis of colorimetric values of the single-color patch and the mixed-color patch.

However, in a conventional mixed-color calibration, to suppress the effect of uneven density in the sub-scanning direction on the page, all patches need to be staggered by a distance corresponding to half the length of the period of uneven density in two positions. Therefore, the mixed-color calibration causes an increase in the number of patches, resulting in an increase in the number of pages for a patch image, i.e., an increase in the number of recording media, such as sheets, required to output the patch image.

SUMMARY OF THE INVENTION

It is an object of the present invention to at least partially solve the problems in the conventional technology.

According to the present invention, there is provided an image forming apparatus that transfers an image formed on a photosensitive element onto a recording medium, the image forming apparatus including: a patch-image generating unit configured to generate a patch image for measuring a color reproduction characteristic and correcting color, the patch image includes mixed-color patch sets each including a plurality of patches each formed by overlaying a plurality of color materials, patches having the same color and the same tone value included in the mixed-color patch sets are arranged away from each other in a circumferential direction of the photosensitive element, and a distance between same tone patches, which are two patches having the same color and the same tone value included in the mixed-color patch sets is close to (N+½) times the length of a period of uneven density which periodically occurs in the circumferential direction of the photosensitive element (N is an integer equal to or greater than 0); and an image forming unit configured to form the generated patch image on the recording medium, wherein the patch image includes single-color patch sets sets including a plurality of patches each formed of a single color material, and the single-color patch sets are arranged between the mixed-colors color patch sets.

According to another aspect of the present invention, there is provided an image forming method executed by an image forming apparatus that transfers an image formed on a photosensitive element onto a recording medium, the image forming method including: generating a patch image for measuring a color reproduction characteristic and correcting color, the patch image in which mixed-color patch sets each including a plurality of patches each formed by overlaying a plurality of color materials are arranged so that patches having the same color and the same tone value included in the mixed-color patch sets are arranged to be kept at a distance in a circumferential direction of the photosensitive element and a distance between same tone patches, which are two patches having the same color and the same tone value included in the mixed-color patch sets, is close to (N+½) times the length of a period of uneven density which periodically occurs in the circumferential direction of the photosensitive element (N is an integer of 0 or greater); and forming the generated patch image on the recording medium.

According to still another aspect of the present invention, there is provided a program executed by a computer that transfers an image formed on a photosensitive element onto a recording medium, the program causing the computer to execute: generating a patch image for measuring a color reproduction characteristic and correcting color, the patch image in which mixed-color patch sets each including a plurality of patches each formed by overlaying a plurality of color materials are arranged so that patches having the same color and the same tone value included in the mixed-color patch sets are arranged to be kept at a distance in a circumferential direction of the photosensitive element and a distance between same tone patches, which are two patches having the same color and the same tone value included in the mixed-color patch sets, is close to (N+½) times the length of a period of uneven density which periodically occurs in the circumferential direction of the photosensitive element (N is an integer of 0 or greater); and forming the generated patch image on the recording medium.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image forming apparatus, an image forming method, and a program according to the present invention are explained in detail below with reference to the accompanying drawings.

First Embodiment

Figure 1:
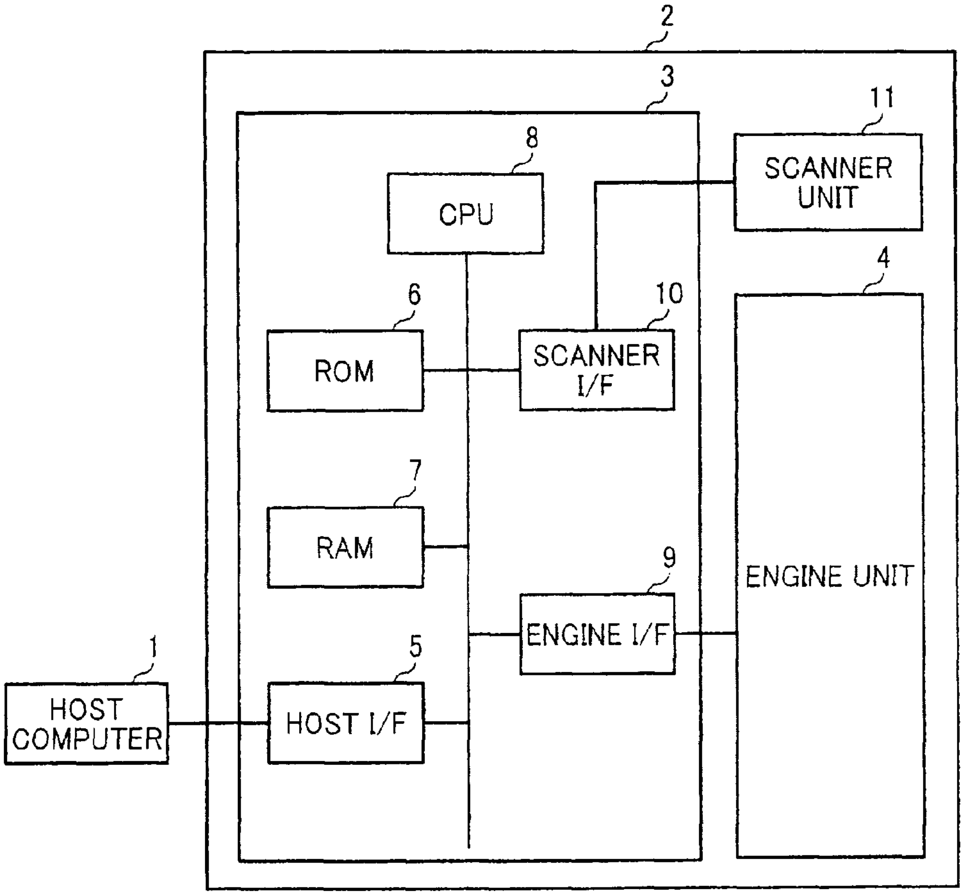
FIG. 1 is a hardware configuration diagram of an image forming apparatus according to a first embodiment.

FIG. 1 is a hardware configuration diagram of an image forming apparatus 2 according to a first embodiment. The image forming apparatus 2 is connected to a host computer 1, and executes a print job when receiving a print request, etc. from the host computer 1.

The image forming apparatus 2 includes a controller unit 3, an engine unit 4, and a scanner unit 11. The controller unit 3 controls the engine unit 4 and the scanner unit 11, thereby realizing the functions of copy, print, and scanner, etc.

The controller unit 3 includes a host interface (hereinafter, referred to as a "host I/F") 5, a ROM 6, a RAM 7, a CPU 8, an engine interface (hereinafter, referred to as an "engine I/F") 9, and a scanner interface (hereinafter, referred to as a "scanner I/F") 10.

The host I/F 5 receives a print request, etc. transmitted from the host computer 1. The print request includes a control command and image data. The ROM 6 stores therein a program for controlling the image forming apparatus 2. The program is executed by the CPU 8. The ROM 6 further stores therein data on a pattern of patches formed when the density and tone are adjusted.

The RAM 7 stores therein image data included in a print request received by the host I/F 5. The image data subjected to a printing process by the engine unit 4 is passed from the RAM 7 to the engine unit 4 via the engine I/F 9.

The CPU 8 realizes a function of controlling the image forming apparatus 2. The CPU 8 realizes this function by executing a computer program stored in the ROM 6. More specifically, the CPU 8 performs, for example, a process of storing image data included in a received print, request in the RAM 7, a process of interpreting a control command included in the print request and instructing to perform a printing process, a process of controlling an operation unit (not shown) forming a user interface, and the like.

The CPU 8 further performs correction of a gamma table used in a screening process performed by the engine I/F 9. Upon the correction, the engine I/F 9 can generate a halftone image that uneven density on a photosensitive drum included in the engine unit 4 and the like are corrected.

When the engine unit 4 executes printing, the engine I/F 9 reads out image data stored in the RAM 7 at predetermined timing, and performs a screening process on the image data, and generates a halftone. The engine I/F 9 generates a pulse-width modulation signal from the generated halftone, and transmits the generated pulse-width modulation signal to the engine unit 4. The pulse-width modulation signal is a signal which turns on or off a laser in a raster order when an image is formed on the photosensitive drum.

The scanner I/F 10 converts a signal input from the scanner unit into image data. The image data is stored in the RAM 7.

The engine unit 4 forms a latent image by exposure to a laser light, develops the latent image, and forms an image on a medium under control of the engine I/F 9. The scanner unit 11 outputs a signal, which is obtained by optically scanning an image, to the scanner I/F 10.

The host computer 1 outputs a print request to the image forming apparatus 2. The host computer 1 outputs the print request on the basis of user operation or the like. The host computer 1 is, for example, a personal computer or the like.

Figure 2:
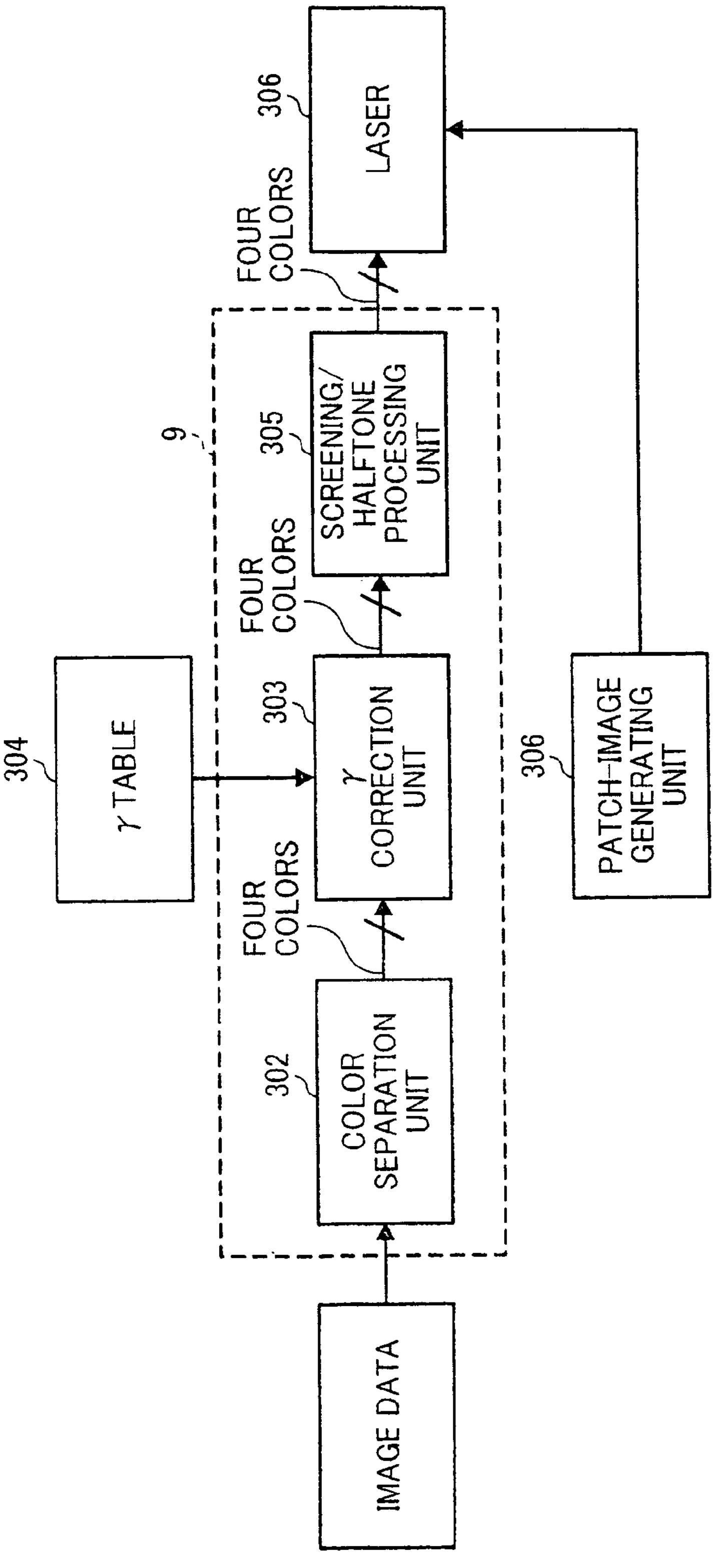
FIG. 2 is a block diagram showing a functional configuration of the image forming apparatus according to the first embodiment.

FIG. 2 is a block diagram showing a functional configuration of the image forming apparatus 2 according to the first embodiment. As shown in FIG. 2, the image forming apparatus 2 according to the present embodiment mainly includes the above-described engine I/F 9, a laser 306, and a patch-image generating unit 310.

The engine I/F 9 includes a color separation unit 302, a gamma correction unit 303, and a screening/halftone processing unit 305. The color separation unit 302 separates image data input from the host computer 1 into four color data, CMYK color data. The gamma correction unit 303 performs a gamma correction on each color data on the basis of a gamma table 304. The screening/halftone processing unit 305 performs a screening process on the image data subjected to the gamma correction, and generates halftone image data.

A signal of the halftone image data is output to the laser 306 as a signal which turns on or off a laser in a raster order. Incidentally, the gamma table 304 is held in, for example, the ROM 6.

The patch-image generating unit 310 generates a patch image for measuring a color reproduction characteristic and correcting color on a memory, such as the RAM 7. The patch image generated on the memory, such as the RAM 7, is printed out on a printing medium by the laser 306 (included in the engine unit 4) working as an image forming unit. Incidentally, details of the patch-image generating unit 310 will be described later.

Figure 3:
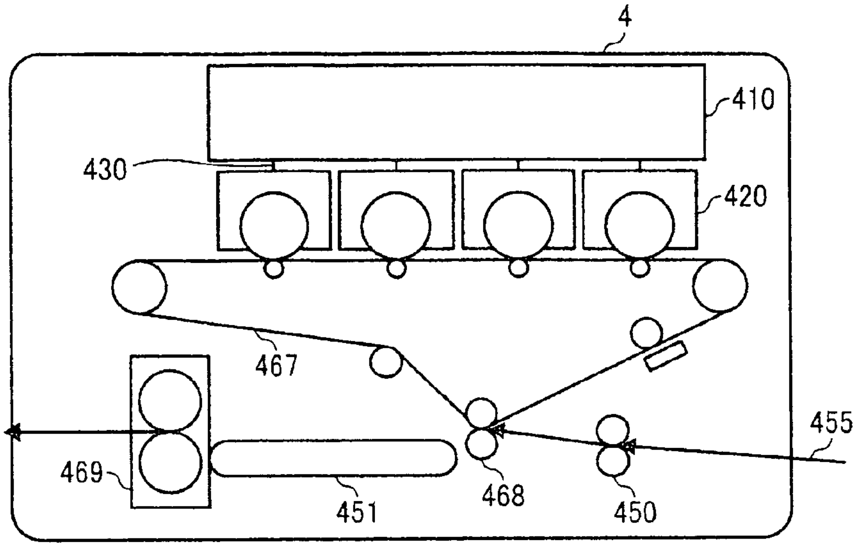
FIG. 3 is a schematic diagram showing an example of a configuration of an engine unit.

FIG. 3 is a schematic diagram showing an example of a configuration of the engine unit 4. The engine unit 4 includes an exposure unit 410, process units 420, a conveying roller 450, a post-transfer conveying unit 451, an intermediate transfer body 467, a secondary transfer unit 468, and a fixing unit 469.

The exposure unit 410 drives a laser on the basis of an input signal of halftone image data, and controls the turning on or off of the laser. By the control, the exposure unit 410 outputs laser lights 430 corresponding to CMYK image data to the respective process units 420.

The process units 420 for CMYK colors are installed. The process units 420 each form a latent image on the photosensitive drum by exposure to the input laser light 430, and develops the latent image into an image, and then transfers the image on the intermediate transfer body 467.

The CMYK images are sequentially transferred onto the intermediate transfer body 467 in a superimposed manner by the process units 420. The transferred superimposed image is transferred onto a medium conveyed on a conveying path 455 by the secondary transfer unit 468.

The conveying roller 450 drives a conveying belt for conveying a medium. The post-transfer conveying unit 451 conveys the medium onto which the image is transferred by the secondary transfer unit 468 to the fixing unit 469. The fixing unit 469 fixes the image on the medium by applying heat and pressure to the medium.

Figure 4:
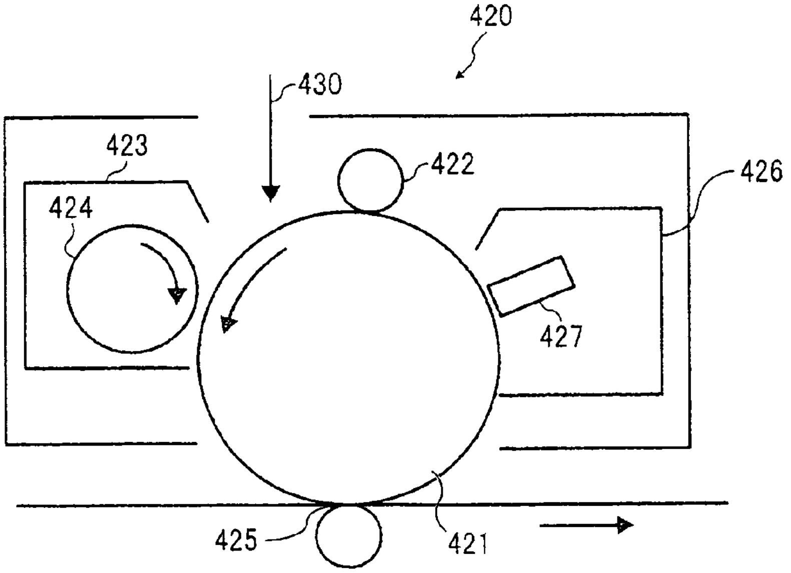
FIG. 4 is a diagram showing an interior configuration of a process unit.

FIG. 4 is a diagram showing an interior configuration of the process unit 420. The process unit 420 includes a photosensitive drum 421, a charging unit 422, a developing unit 423, and a cleaning unit 426.

The photosensitive drum 421 is charged by the charging unit 422, and exposed to a laser light 430, and a latent image is formed on the photosensitive drum 421. After that, toner is transferred to the photosensitive drum 421 by the developing unit 423, and the latent image is developed into a toner image. The toner image on the photosensitive drum 421 is transferred onto the intermediate transfer body 467 by a primary transfer unit 425.

After the toner image is transferred onto the intermediate transfer body 467, residual toner remaining on the photosensitive drum 421 is removed by the cleaning unit 426.

The charging unit 422 charges the photosensitive drum 421. The developing unit 423 develops a latent image formed on the photosensitive drum 421 by exposure to a laser light 430 into a toner image by transferring toner to the photosensitive drum 421. The developing unit 423 includes a developing roller 424. The developing roller 424 attaches toner to the photosensitive drum 421.

The cleaning unit 426 removes residual toner from the photosensitive drum 421 after a toner image is transferred onto the intermediate transfer body 467. The cleaning unit 426 includes a cleaning blade 427. The cleaning blade 427 is a rubber blade, and removes residual toner from the photosensitive drum 421 by scraping the residual toner off.

Figure 5:
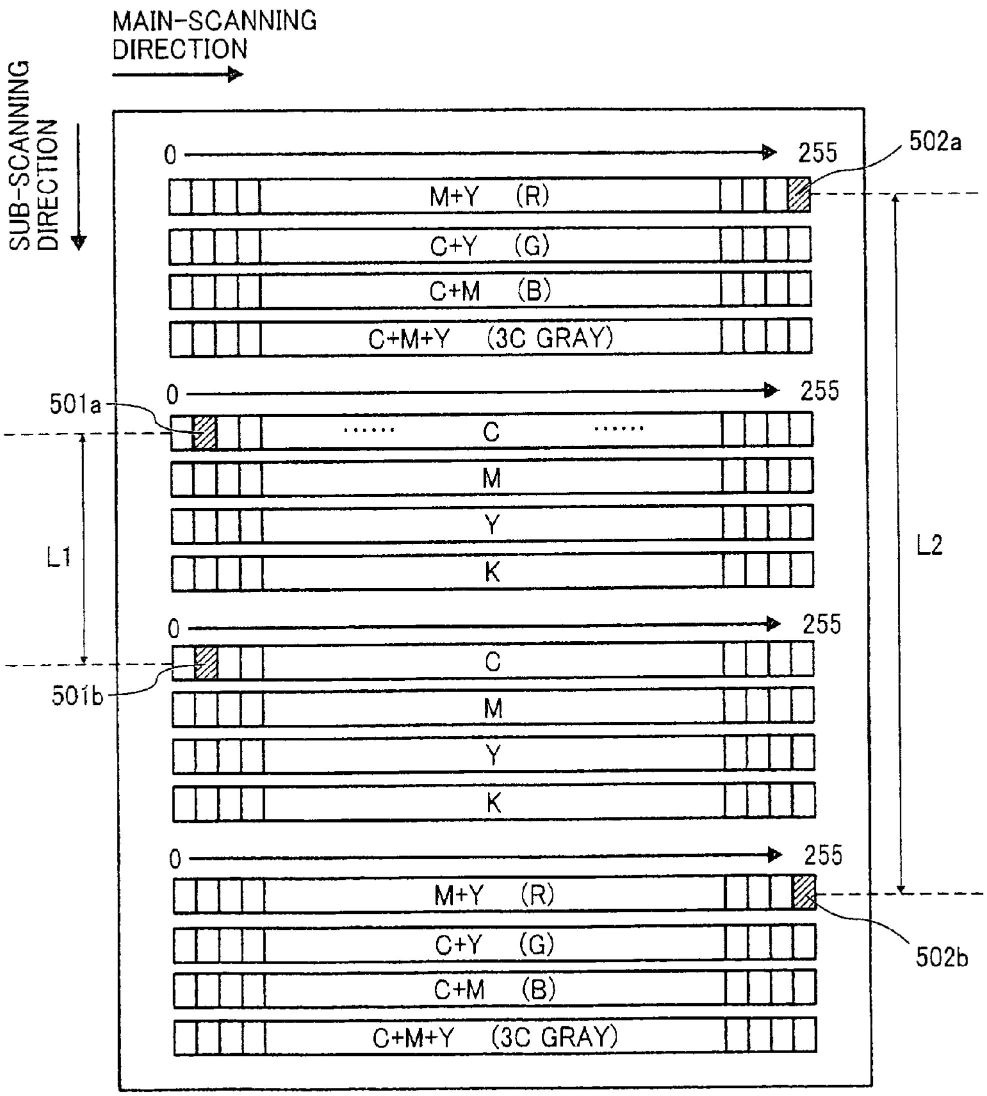
FIG. 5 is a schematic diagram showing an example of a patch image generated by a patch-image generating unit according to the first embodiment.

Subsequently, details of the patch-image generating unit 310 are explained. FIG. 5 is a schematic diagram showing an example of a patch image generated by the patch-image generating unit 310 according to the first embodiment.

The patch-image generating unit 310 according to the present embodiment generates a patch image in which mixed-color patch sets are arranged so that a distance between same tone patches included in the mixed-color patch sets adjacent to each other is close to (N+½) times the period of uneven density which periodically occurs in a circumferential direction of the photosensitive drum 421 (N is an integer of 0 or greater) and single-color patch sets are arranged in between the mixed-color patch sets.

The mixed-color patch set here means a set of a plurality of patches each formed by overlaying a plurality of color materials. A patch set consisting of an M+Y patch, a C+Y patch, a C+M patch, and a C+M+Y patch shown in FIG. 5 corresponds to one mixed-color patch set. The single-color patch set here means a set of a plurality of patches each formed of a single color (primary color) material. A patch set consisting of a C patch, an M patch, a Y patch, and a K patch shown in FIG. 5 corresponds to one single-color patch set.

Furthermore, the distance between same tone patches here means an interval between two same tone patches, i.e., two patches included in two patch sets adjacent to each other which are the same in color and tone value. A distance between same tone patches in the single-color patch sets is a distance L1 between two patches 501*a* and 501*b* included in two single-color patch sets adjacent to each other, which are the same in color and tone value, shown in FIG. 5. A distance between same tone patches in the mixed-color patch sets is a distance L2 between two patches 502*a* and 502*b* included in two mixed-color patch sets adjacent to each other, which are the same in color and tone value, shown in FIG. 5.

Incidentally, in the present embodiment, a plurality of patches generated from image data having uniform color and a uniform tone are referred to as "same tone patches".

More specifically, the patch-image generating unit 310 according to the present embodiment generates a patch image including two single-color patch sets and two mixed-color patch sets as shown in FIG. 5. At this time, the patch-image generating unit 310 generates a patch image for mixed-color calibration in which patches are laid out to fit on one page of printing sheet so that a distance L2 between same tone patches in the mixed-color patch sets is greater than a distance L1 between same tone patches in the single-color patch sets and also the distance L2 is close to half the length of a period of uneven density which periodically occurs in the sub-scanning direction. Namely, it is expressed in "L1<L2≈½ period", and N is set to zero (N=0) in the present embodiment.

In this manner, a distance between same tone patches differs between the single-color patch sets and the mixed-color patch sets, so that the patches can be relatively tightly and efficiently arranged on the page. As amplitude of uneven density of the mixed-color patch sets may become large, a distance between same tone patches in the mixed-color patch sets is set to close to (N+½) times the period of uneven density, so that the suppressing effect on uneven density when being averaged can work maximally. Furthermore, as for the single-color patch sets, the uneven density can be suppressed if averaged.

Here, it is preferable that a distance between same tone patches in the single-color patch sets is also close to (N+½) times the period of uneven density; however, to prevent the patch image from extending over multiple pages of printing sheets, the distance L1 between same tone patches in the single-color patch sets is set to be shorter than the distance L2 between same tone patches in the mixed-color patch sets and the single-color patch sets are arranged in between the mixed-color patch sets so that the patch image can fit on one page.

Subsequently, the reason why the uneven density of the single-color patch sets can be suppressed even though the distance between same tone patches in the single-color patch sets is not close to (N+½) times the period of uneven density is explained.

Figure 6:
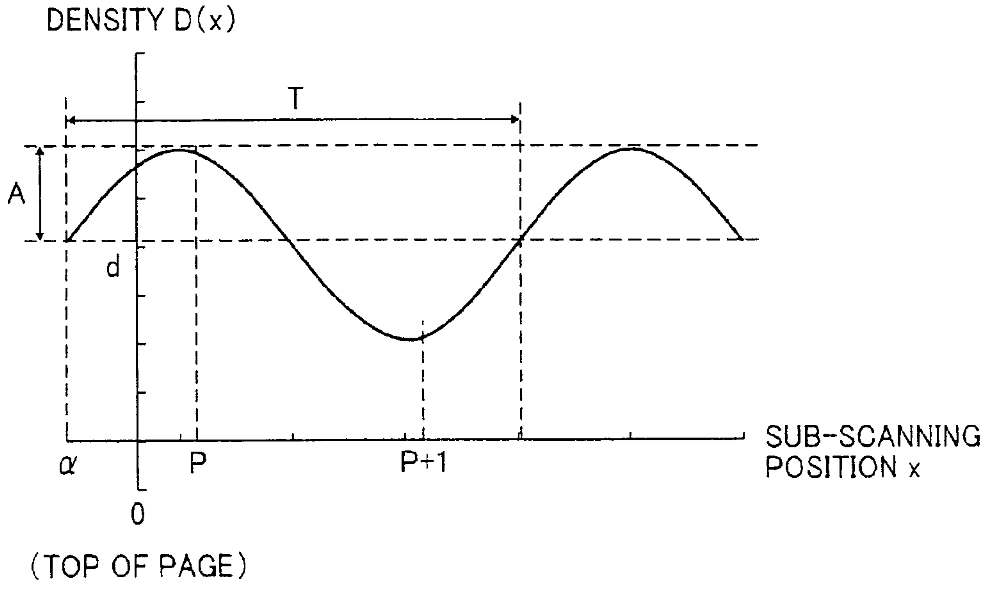
FIG. 6 is a graph for explaining uneven density which periodically occurs in a sub-scanning direction.

FIG. 6 is a graph for explaining uneven density which periodically occurs in the sub-scanning direction. The vertical axis indicates a density, and the horizontal axis indicates a distance p from the start position of patch formation. When uneven density is schematically expressed using a sinusoidal wave, a density D(x) in a sub-scanning position x is represented by the following equation (1).

$$D(x) = d + A \cdot \sin\left(2\pi\frac{x-\alpha}{T}\right) \tag{1}$$

In equation (1), "T" denotes a distance of one period of uneven density, and corresponds to the circumferential length of the photosensitive drum 421; "d" denotes a corrected density value; "A" denotes amplitude of density; "α" denotes an offset value of the head position of a printing sheet with respect to the head position of the period of uneven density. FIG. 6 shows a waveform of the density D(x) in the sub-scanning position x represented by equation (1).

Figure 7:
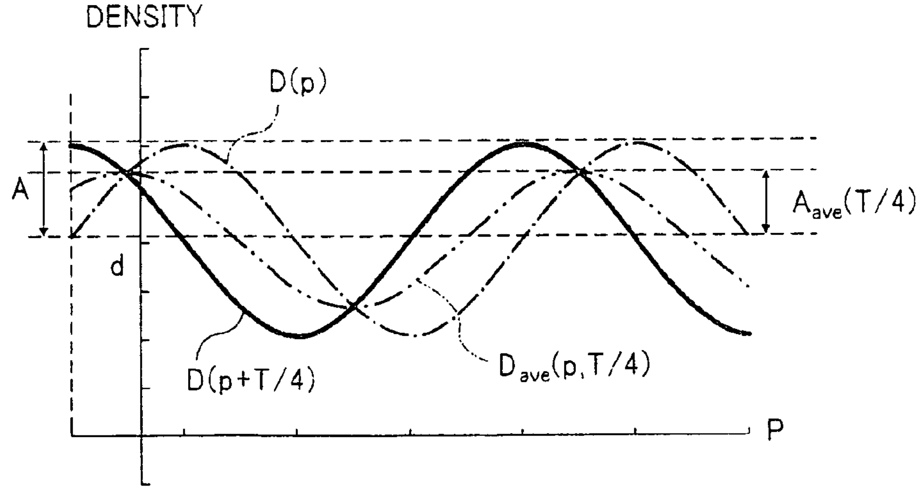
FIG. 7 is a graph for explaining an average density of same tone patches when a distance between the same tone patches is one-quarter the length of a period of uneven density in the sub-scanning direction.

FIG. 7 is a graph for explaining an average density of same tone patches when a distance between the same tone patches is one-quarter the length of the period of uneven density in the sub-scanning direction. In FIG. 7, D(p) denotes a density in a sub-scanning position p; D(p+T/4) denotes a density in a position kept at a distance of T/4 from the sub-scanning position p; $D_{ave}$(p, T/4) denotes an average value of D(p) and D(p+T/4). The average density $D_{ave}$(P, T/4) is represented by the following equation (2) by being converted using the addition theorem and synthesis formula of trigonometric function based on the equation (1).

$$D_{ave}(p, 1) = \frac{D(p) + (D+1)}{2} = d + \frac{A}{2}\sqrt{a^2+b^2}\sin\left(2\pi\frac{p}{T}+\omega\right) \tag{2}$$

"a" and "b" in equation (2) are represented by the following equations (3) and (4), respectively.

$$a = \cos U\cdot(1+\cos V)+\sin U\cdot\sin V \tag{3}$$

$$b = -\sin U\cdot(1+\cos V)+\cos U\cdot\sin V \tag{4}$$

"U" and "V" in equations (3) and (4) are represented by the following equations (5) and (6).

$$U = 2\pi\frac{\alpha}{T} \tag{5}$$

$$V = 2\pi\frac{1}{T} \tag{6}$$

Incidentally, "ω" in equation (2) meets the following equations (7) and (8).

$$\sin\omega = \frac{b}{\sqrt{a^2+b^2}} \tag{7}$$

$$\cos\omega = \frac{a}{\sqrt{a^2+b^2}} \tag{8}$$

In FIG. 7, waveforms of the density D(p) in the sub-scanning position p, the density D(p+T/4) in the position kept at the distance of T/4 from the sub-scanning position p, and the average density $D_{ave}$(p, T/4) of the two densities D(p) and D(p+T/4) based on equations (1) and (2) are overlaid for comparison. When amplitude of $D_{ave}$(p, T/4) is denoted by $A_{ave}$(T/4), from equations (2) to (8) and FIG. 7, the amplitude $A_{ave}$(T/4) is smaller than the amplitude A in equation (1). Therefore, even though the distance between same tone patches is one-quarter the length of the period of uneven density, amplitude of the uneven density can be suppressed if averaged.

Figure 8:
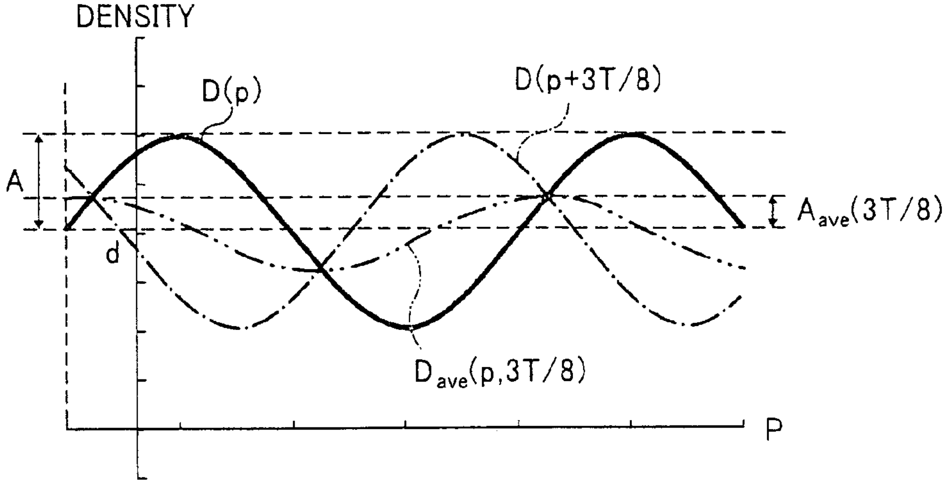
FIG. 8 is a graph for explaining an average density of two same tone patches when a distance between the same tone patches is three-eighths of the period of uneven density in the sub-scanning direction.

FIG. 8 is a graph for explaining an average density of same tone patches when a distance between the same tone patches is three-eighths of the period of the uneven density in the sub-scanning direction. In FIG. 8, D(p) denotes a density in a sub-scanning position p; D(p+3T/8) denotes a density in a position kept at a distance of 3T/8 from the sub-scanning position p; $D_{ave}$(P, 3T/8) denotes an average value of D(p) and D(p+3T/8). In FIG. 8, waveforms of D(p), D(p+3T/8), and $D_{ave}$(p, 3T/8) are overlaid for comparison.

From FIG. 8, amplitude $A_{ave}$(3T/8) is smaller than the amplitude $A_{ave}$(T/4) in FIG. 7. Therefore, the suppressing effect on uneven density by averaging is higher in the case of the distance of three-eighths of the period of uneven density than in the case of the distance of one-quarter the length of the period of uneven density.

Figure 9:
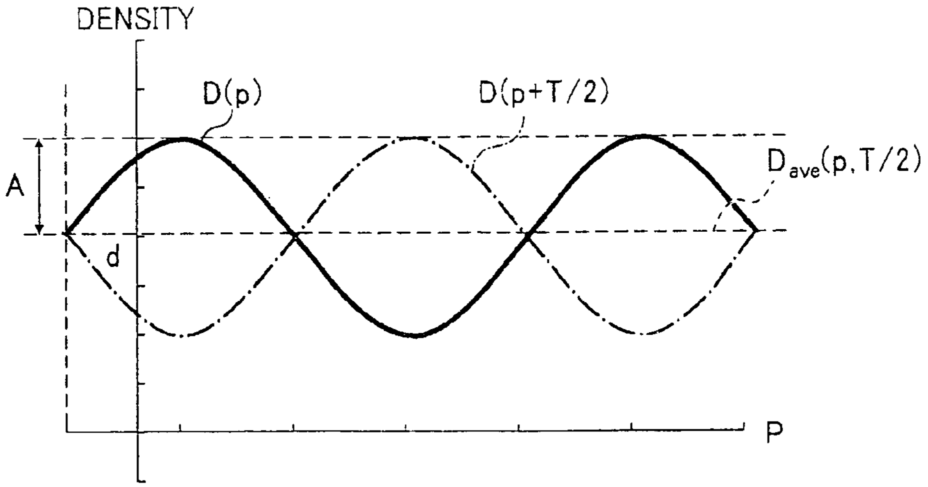
FIG. 9 is a graph for explaining an average density of same tone patches when a distance between the same tone patches is half the length of the period of uneven density in the sub-scanning direction.

FIG. 9 is a graph for explaining an average density of same tone patches when a distance between the same tone patches is half the length of the period of the uneven density in the sub-scanning direction. In FIG. 9, D(p) denotes a density in a sub-scanning position p; D(p+T/2) denotes a density in a position kept at a distance of T/2 from the sub-scanning position p; $D_{ave}$(p, T/2) denotes an average value of the two densities D(p) and D(p+T/2). In FIG. 9, waveforms of D(p), D(p+T/2), and $D_{ave}$(p, T/2) are overlaid for comparison.

From FIG. 9, when the distance between the same tone patches is half the length of the period of uneven density, the uneven density is offset by averaging in the same manner as the conventional technology.

Figure 10:
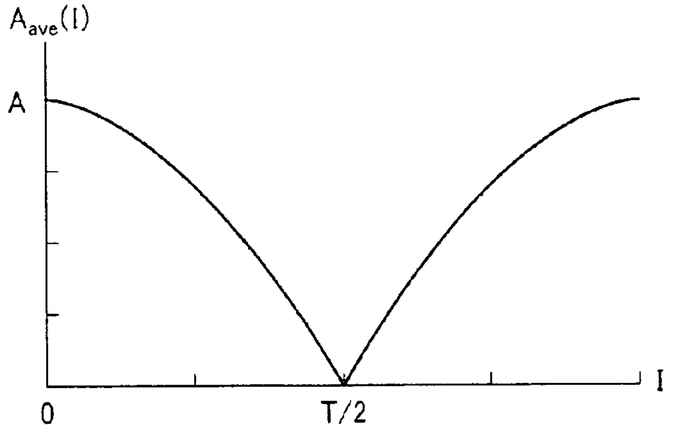
FIG. 10 is a graph showing a relation between a distance between same tone patches and amplitude of density after uneven density is averaged.

FIG. 10 is a graph showing a relation between a distance between same tone patches and amplitude of density after uneven density is averaged. In FIG. 10, the horizontal axis indicates a distance l between same tone patches, and the vertical axis indicates amplitude $A_{ave}(l)$.

The following equation (9) expresses the amplitude $A_{ave}$ (l) after the averaging with respect to the distance l between same tone patches. Equation (9) is derived by extracting a portion corresponding to the amplitude in equation (2) and substituting the portion into equations (3) and (4).

$$A_{ave}(l) = \frac{A}{2}\sqrt{a^2+b^2} = \frac{A}{2}\sqrt{2+2\cos V} \tag{9}$$

FIG. 10 is a graph showing the amplitude $A_{ave}(l)$ after the averaging with respect to the distance l between patches based on equation (9). Namely, from FIG. 10, as the distance between same tone patches is closer to half the length of the period of uneven density, the amplitude after the averaging becomes smaller. However, even though the distance between same tone patches need not be half the length of the period of uneven density, for example, even when the distance between same tone patches is one-quarter or three-eighths the length of the period of uneven density, the amplitude can be reduced. Therefore, even though the distance between same tone patches in the single-color patch sets is not close to (N+½) times the period of uneven density, the uneven density can be suppressed.

Subsequently, the reason why the amplitude of uneven density in the mixed-color patch sets is larger than that is in the single-color patch sets is explained. The image forming apparatus 2 shown in FIG. 3 includes the photosensitive drums 421 for each color material, and the photosensitive drums 421 have the same diameter. In general, it is often the case that photosensitive drums for C, M, and Y-color toners have the same diameter. Therefore, the period of uneven density in the sub-scanning direction, which periodically occurs in accordance with the circumferential length of the photosensitive drum 421, can be assumed to be the same. Here, amplitude when color materials having the same period of uneven density are overlaid is considered.

When a density $D_m(x)$ of a first single color is represented by equation (10) and a density $D_y(x)$ of a second single color is represented by equation (11), a density $D_r(x)$ of a mixed color, a mixture of the two single colors, can be represented by equation (12).

$$D_m(x) = d_m + A_m\cdot\sin\left(2\pi\frac{x-\alpha_m}{T}\right) \tag{10}$$

$$D_y(x) = d_y + A_y\cdot\sin\left(2\pi\frac{x-\alpha_y}{T}\right) \tag{11}$$

$$D_r(x) = D_m(x)+D_y(x) = (d_m+d_y)+\sqrt{a_r^2+b_r^2}\cdot\sin\left(2\pi\frac{x}{T}+\omega_r\right) \tag{12}$$

$D_r(x)$ in equation (12) is derived by using the addition theorem and synthesis formula of trigonometric function with respect to equations (10) and (11). Incidentally, $a_r$ and $b_r$ in equation (12) are represented by the following equations (13) and (14), respectively. Furthermore, $\omega_r$ in equation (12) meets the following equations (15) and (16).

$$a_r = A_m\cdot\cos\left(2\pi\frac{\alpha_m}{T}\right)+A_y\cdot\cos\left(2\pi\frac{\alpha_y}{T}\right) \tag{13}$$

$$b_r = A_m\cdot\sin\left(2\pi\frac{\alpha_m}{T}\right)+A_y\cdot\sin\left(2\pi\frac{\alpha_y}{T}\right) \tag{14}$$

$$\sin\omega_r = \frac{-b_r}{\sqrt{a_r^2+b_r^2}} \tag{15}$$

$$\cos\omega_r = \frac{a_r}{\sqrt{a_r^2+b_r^2}} \tag{16}$$

Amplitude $A_r$ when two single colors are overlaid is represented by the following equation (17). The following equation (17) is derived by extracting a portion corresponding to the amplitude in equation (12) and substituting the portion into equations (13) and (14).

$$\begin{aligned} A_r(\alpha_m,\alpha_y) &= \sqrt{a_r^2+b_r^2} \\ &= \sqrt{A_m^2+A_y^2+2A_mA_y\cos\left(2\pi\frac{\alpha_m-\alpha_y}{T}\right)} \end{aligned} \tag{17}$$

Figure 11:
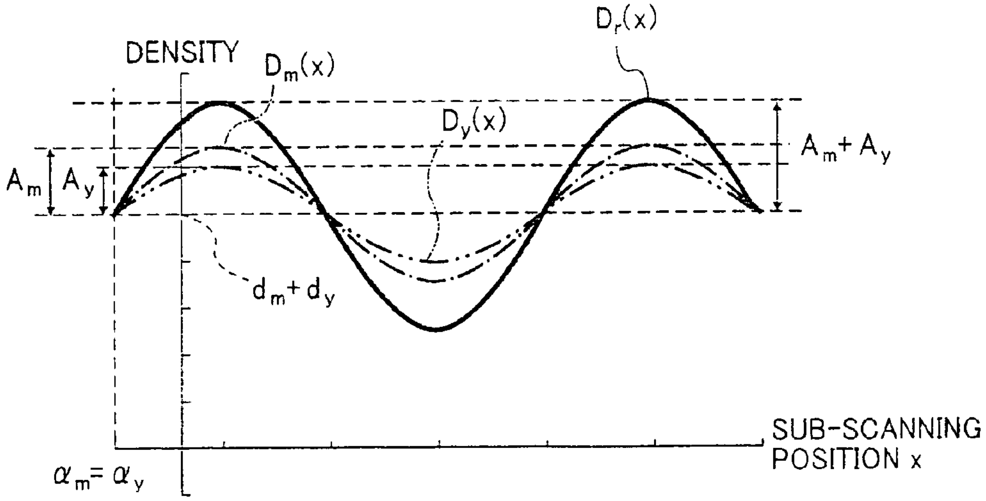
FIG. 11 is a graph for explaining uneven density of a mixed color.

FIG. 11 is a graph for explaining uneven density of a mixed color, and shows values of respective densities $D_m(x)$ and Dy(x) of two single colors and a density $D_r(x)$ of a mixed color, a mixture of the two single colors, with respect to the sub-scanning direction under the condition of $\alpha_m=\alpha_y$. Amplitude of the density of the mixed color varies according to $\alpha_m$ and $\alpha_y$, and peaks under the condition of $\alpha_m=\alpha_y$ as shown in FIG. 11. Amplitude $A_r$ ($\alpha_m$, $\alpha_y$) at this time is ($A_m+A_y$). Therefore, the amplitude of the density of the mixed color may be larger than those of the single colors. That's why the amplitude of uneven density in the mixed-color patch sets is larger than that is in the single-color patch sets.

Figure 12:
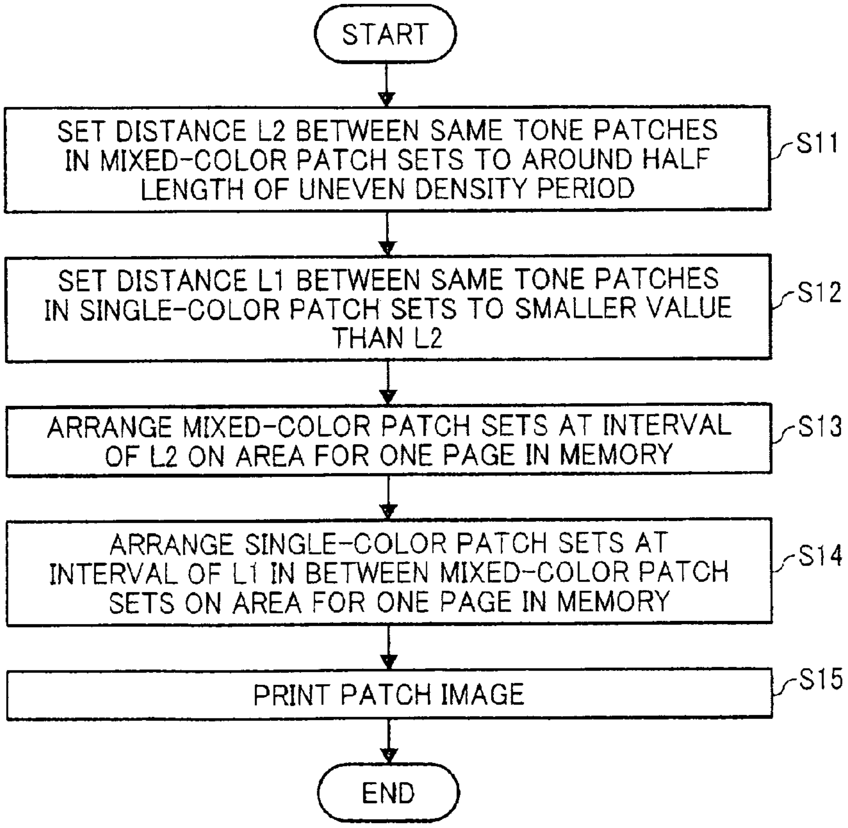
FIG. 12 is a flowchart showing a procedure of a patch-image generating process according to the first embodiment.

Subsequently, a patch-image generating process performed by the image forming apparatus 2 according to the present embodiment configured as described above is explained. FIG. 12 is a flowchart showing a procedure of the patch-image generating process according to the first embodiment.

First, the patch-image generating unit 310 sets a distance L2 between same tone patches in mixed-color patch sets to around half the length of an uneven density period (Step S11). Then, the patch-image generating unit 310 sets a distance L1 between same tone patches in single-color patch sets to a value smaller than the distance L2 (Step S12).

Then, the patch-image generating unit 310 arranges the mixed-color patch sets at an interval of L2 on an area for one page in the memory, such as the RAM 7 (Step S13). Furthermore, the patch-image generating unit 310 arranges the single-color patch sets at an interval of L1 in between the mixed-color patch sets on the area for one page in the memory (Step S14). As a result, a patch image for one page is generated on the memory.

Then, the generated patch image is printed out on a printing sheet by the laser 306 (the engine unit 4) (Step S15).

In this manner, in the present embodiment, mixed-color patch sets are arranged so that a distance between same tone patches in the mixed-color patch sets is close to (N+½) times the length of a period of uneven density which periodically occurs in the circumferential direction of the photosensitive drum 421 (N is an integer of 0 or greater), and single-color patch sets are arranged in between the mixed-color patch sets, thereby generating a patch image; therefore, the effect of the uneven density in the sub-scanning direction on the page can be effectively suppressed, and the number of pages required to output the patch image including the mixed-color patch sets can be reduced.

Second Embodiment

In the first embodiment, mixed-color patch sets and single-color patch sets are laid out so that a patch image can be printed to fit on one page of a printing sheet. However, depending on the size of the photosensitive drum 421 and the size of a printing sheet, mixed-color patch sets and single-color patch sets may not be laid out to fit on one page. Therefore, in a second embodiment, even in such a case, the number of pages required to output a patch image is reduced as few as possible while suppressing the effect of uneven density in the sub-scanning direction on the page effectively.

The patch-image generating unit 310 according to the present embodiment arranges mixed-color patch sets so that a distance between same tone patches included in the mixed-color patch sets adjacent to each other is close to (N+½) times the length of a period of uneven density which periodically occurs in the circumferential direction of the photosensitive drum 421 (N is an integer of 0 or greater). Furthermore, the patch-image generating unit 310 separates single-color patch sets into a plurality of groups by color, and arranges the groups of the single-color patch sets in between the mixed-color patch sets so that a distance between same tone patches in each of the groups of the single-color patch sets differs from group to group, thereby generating a patch image. Incidentally, the configuration of the image forming apparatus 2 other than the patch-image generating unit 310 is the same as in the first embodiment.

Figure 13:
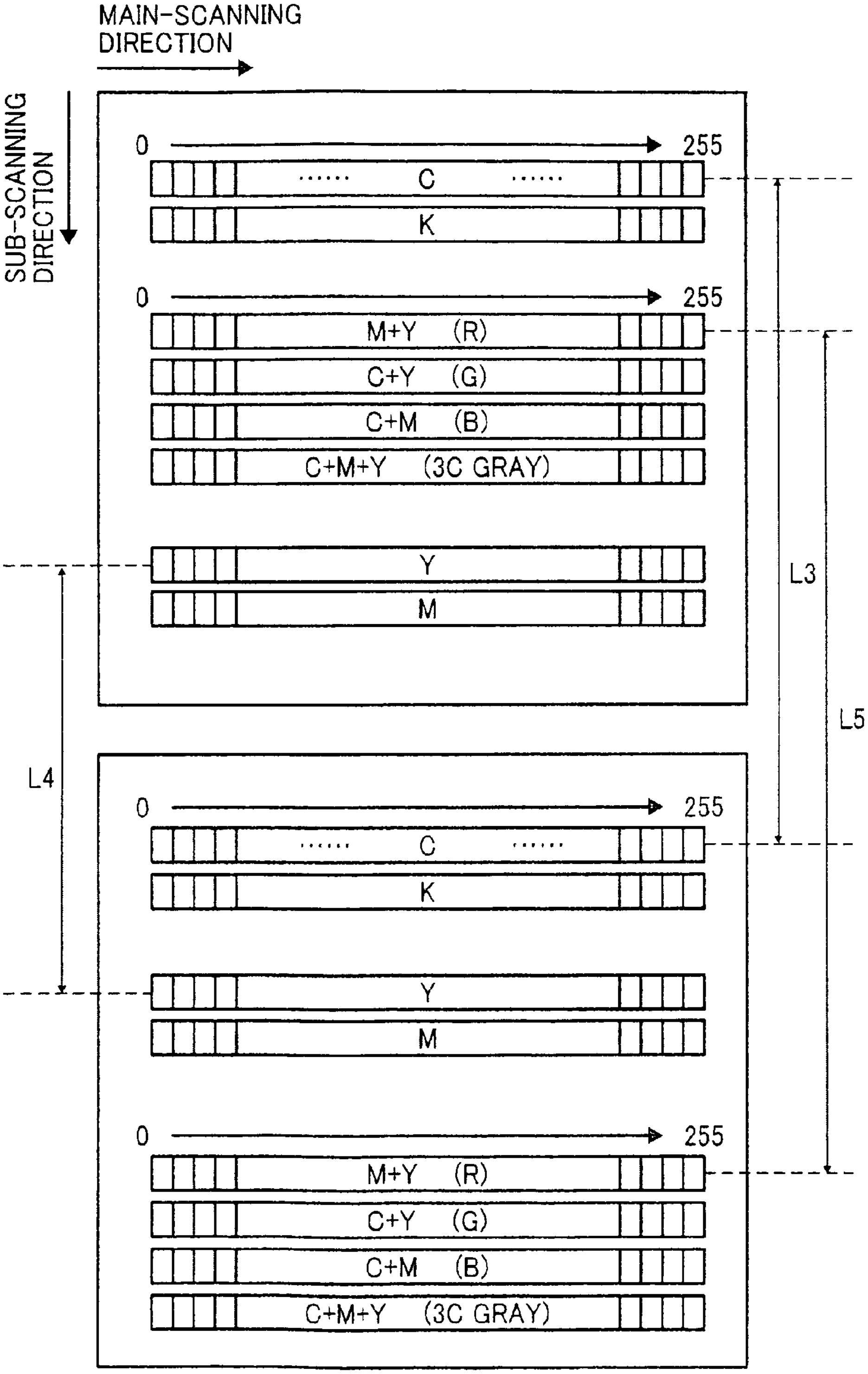
FIG. 13 is a schematic diagram showing an example of a patch image generated by a patch-image generating unit according to a second embodiment.

FIG. 13 is a schematic diagram showing an example of a patch image generated by the patch-image generating unit 310 according to the second embodiment. In the present example, N is set to zero (N=0).

More specifically, the patch-image generating unit 310 according to the present embodiment generates a patch image including two single-color patch sets which are the same in color and tone and two mixed-color patch sets which are the same in color and tone as shown in FIG. 13, and divides the single-color patch sets into a first group consisting of a C patch and a K patch and a second group consisting of a Y patch and an M patch.

Then, the patch-image generating unit 310 arranges the patch sets so that a distance L5 between same tone patches in the mixed-color patch sets is larger than a distance L3 between same tone patches of the first group of the single-color patch sets and a distance L4 between same tone patches of the second group of the single-color patch sets and also the distance L5 is close to half the length of a period of uneven density which periodically occurs in the sub-scanning direction. Furthermore, the patch-image generating unit 310 arranges the single-color patch sets so that the distance L3 between same tone patches in the first group is different from the distance L4 between same tone patches in the second group.

This way, the single-color patch sets can be also arranged so that a distance between same tone patches is close to (N+½) times the length of a period of uneven density which periodically occurs in the circumferential direction of the photosensitive drum 421 (N is an integer of 0 or greater).

Furthermore, if a distance between same tone patches in the single-color patch sets and a distance between same tone patches in the mixed-color patch sets are both set to the distance L5, i.e., half the length of the uneven density period, the number of printing sheets required to print out the patch image can be reduced from three pages to two pages, so the number of pages can be minimized. Moreover, the distance L5 is brought close to half the length of the uneven density period, and the two pages are continuously output thereby averaging the uneven density, so that the uneven density of the mixed-color patch sets of which the amplitude is larger than that of the uneven density of the single-color patch sets can be particularly suppressed intensively.

Figure 14:
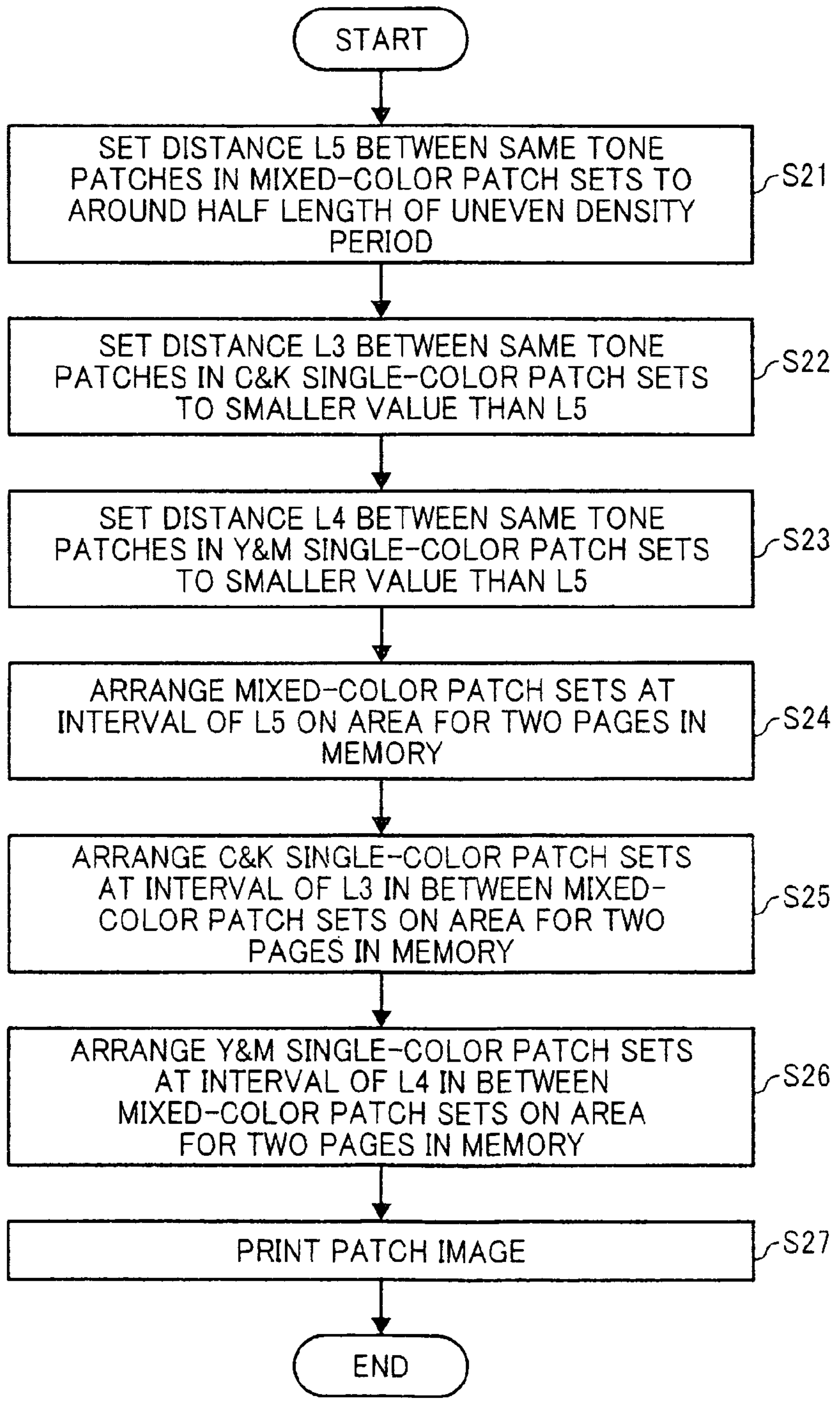
FIG. 14 is a flowchart showing a procedure of a patch-image generating process according to the second embodiment.

Subsequently, a patch-image generating process in the present embodiment configured as described above is explained. FIG. 14 is a flowchart showing a procedure of the patch-image generating process according to the second embodiment.

First, the patch-image generating unit 310 sets a distance L5 between same tone patches in mixed-color patch sets to around half the length of an uneven density period (Step S21). Then, the patch-image generating unit 310 sets a distance L3 between same tone patches of a first group consisting of a C patch and a K patch, of single-color patch sets to a value smaller than the distance L5 (Step S22). Then, the patch-image generating unit 310 sets a distance L4 between same tone patches of a second group consisting of a Y patch and an M patch, of the single-color patch sets to a value which is smaller than the distance L5 and different from the distance L3 (Step S23).

Then, the patch-image generating unit 310 arranges the mixed-color patch sets at an interval of L5 on an area for two pages in the memory, such as the RAM 7 (Step S24). Furthermore, the patch-image generating unit 310 arranges the single-color patch sets of the first group consisting of the C patch and the K patch at an interval of L3 in between the mixed-color patch sets on the area for two pages in the memory (Step S25). Moreover, the patch-image generating unit 310 arranges the single-color patch sets of the second group consisting of the Y patch and the M patch of at an interval of L4 in between the mixed-color patch sets on the area for two pages in the memory (Step S26). As a result, a patch image for two pages is generated on the memory.

Then, the generated patch image is printed out on printing sheets by the laser 306 (the engine unit 4) (Step S27).

In this manner, in the present embodiment, mixed-color patch sets are arranged so that a distance between same tone patches in the mixed-color patch sets is close to (N+½) times the length of a period of uneven density which periodically occurs in the circumferential direction of the photosensitive drum 421 (N is an integer of 0 or greater), and single-color patch sets is separated into a plurality of groups by color, and then the single-color patch sets are arranged in between the mixed-color patch sets so that a distance between same tone patches of each group of the single-color patch sets differs from group to group, thereby generating a patch image; therefore, while suppressing the effect of uneven density in the sub-scanning direction on each page effectively, the number of pages required to output the patch image can be reduced as few as possible.

Third Embodiment

In the first and second embodiments, the number of types of mixed-color patch sets is one. In a third embodiment, a patch image including two types of mixed-color patch sets is generated.

The patch-image generating unit 310 according to the present embodiment arranges same tone patches in mixed-color patch sets to be kept at a distance in the circumferential direction of the photosensitive drum 421, and generates the mixed-color patch sets so that the mixed-color patch sets are divided into first patch sets each consisting of patches formed of the predetermined number of color materials, three or more color materials, and second patch sets each consisting of patches formed of less than three color materials. Then, the patch-image generating unit 310 arranges the mixed-color patch sets so that a distance between same tone patches in the first patch sets is closer to (N+½) times the length of an uneven density period (N is an integer of 0 or greater) than a distance between same tone patches in the second patch sets, and arranges single-color patch sets in between the mixed-color patch sets, thereby generating a patch image. Incidentally, the configuration of the image forming apparatus 2 other than the patch-image generating unit 310 is the same as in the first embodiment.

Figure 15:
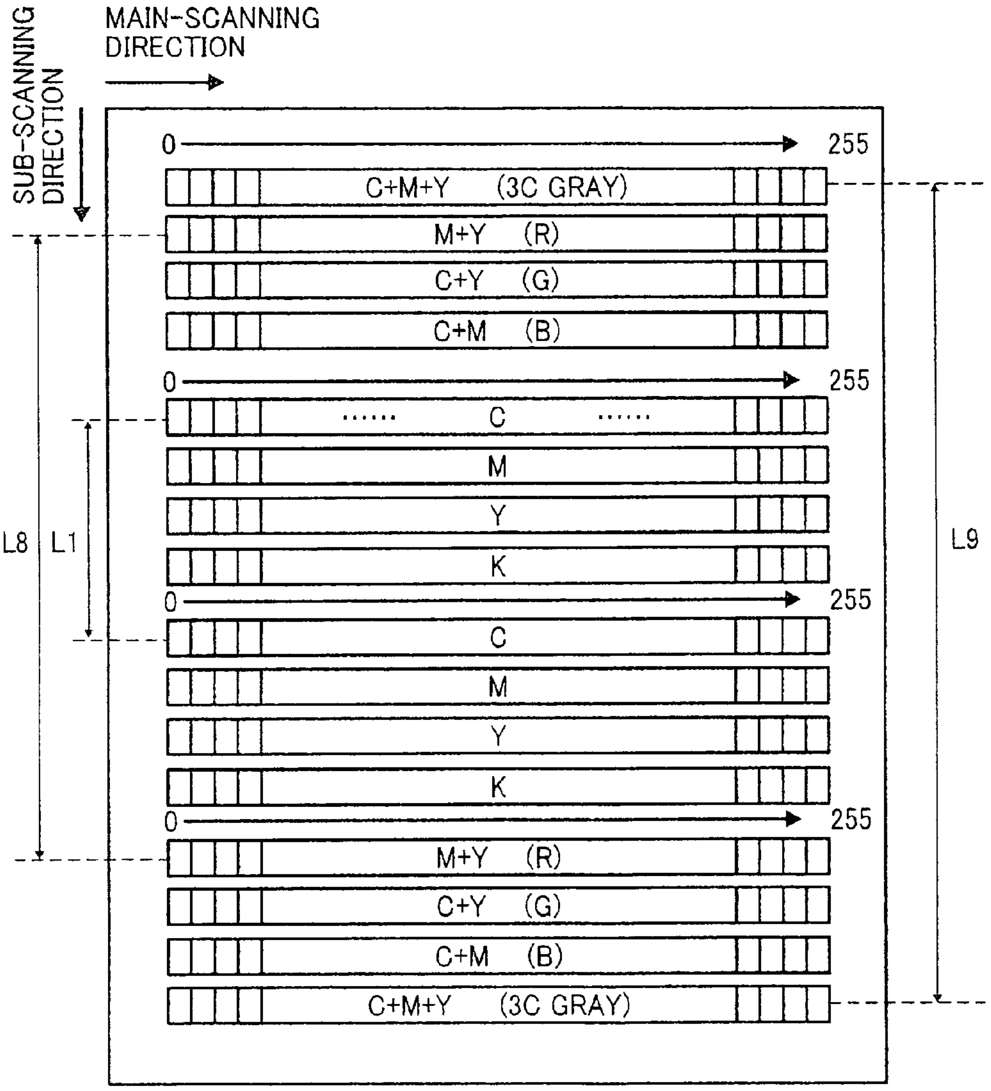
FIG. 15 is a schematic diagram showing an example of a patch image generated by a patch-image generating unit according to a third embodiment.

FIG. 15 is a schematic diagram showing an example of a patch image generated by the patch-image generating unit 310 according to the third embodiment. In the present example, N is set to zero (N=0).

More specifically, the patch-image generating unit 310 arranges the mixed-color patch sets so that a distance L9 between same tone patches in the first patch sets each consisting of a gray patch formed by overlaying C, M, and Y color materials (hereinafter, referred to as a "3C-gray patch") is different from a distance L8 between same tone patches in the second patch sets each consisting of secondary color patches formed by overlaying two color materials, such as an M+Y patch, a C+Y patch, and a C+M patch.

As explained with reference to FIG. 7, for the same reason that amplitude of density of secondary color may be larger than that of the single-color patch set, amplitude of uneven density of tertiary color, 3C gray in this case, may be larger than that of secondary color.

Therefore, the patch-image generating unit 310 according to the present embodiment generates a patch image in which mixed-color patch sets are arranged so that the distance L9 between same tone patches in the first patch sets, i.e., 3C-gray patch sets is closer to half the length of the period of uneven density, which periodically occurs in the sub-scanning direction, than the distance L8 between same tone patches in the second patch sets, i.e., secondary-color patch sets. This way, the suppressing effect on uneven density when being averaged can work maximally, especially in 3C gray.

Incidentally, the patch-image generating unit 310 arranges single-color patch sets in between the mixed-color patch sets in the same manner as in the first embodiment.

Figure 16:
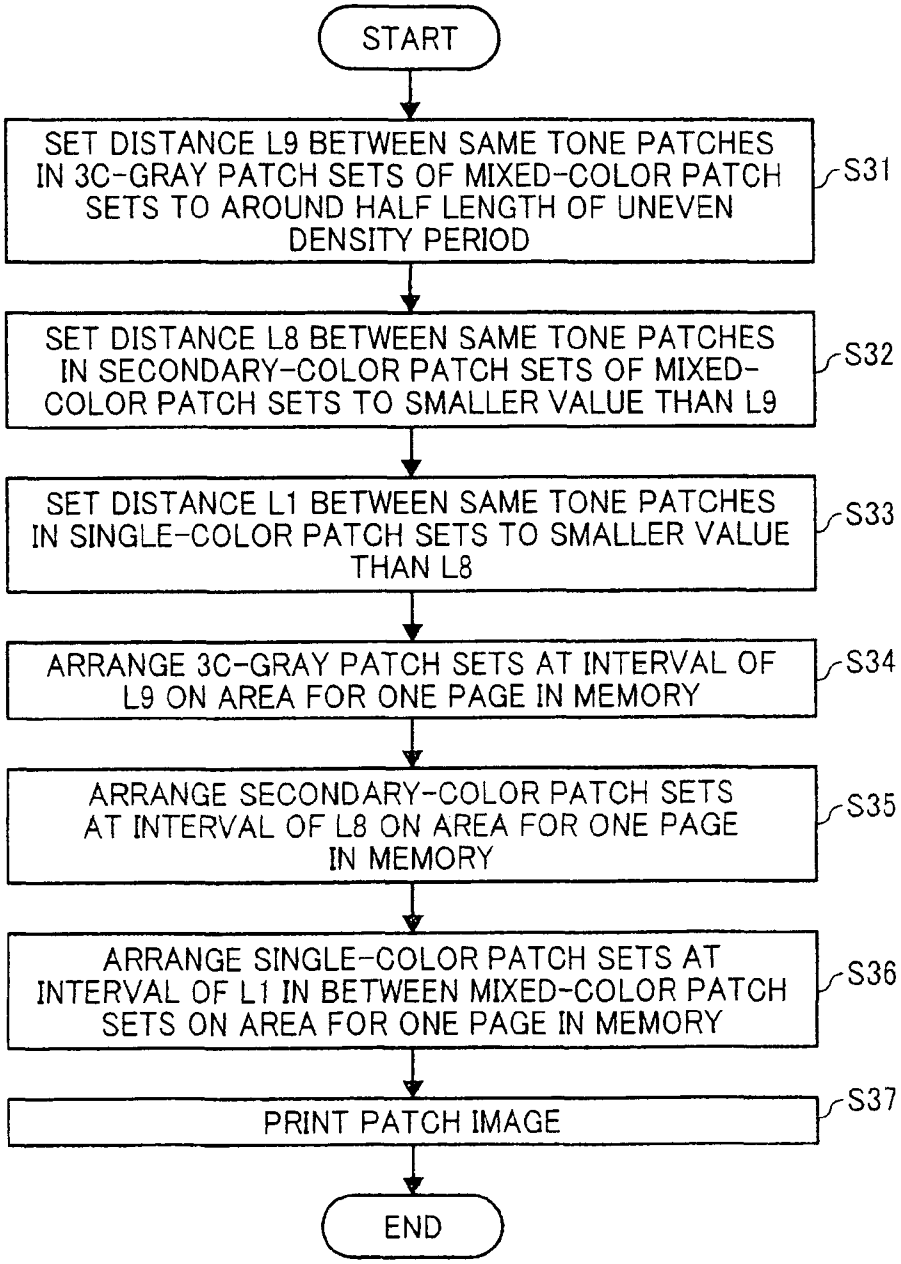
FIG. 16 is a flowchart showing a procedure of a patch-image generating process according to the third embodiment.

Subsequently, a patch-image generating process performed by the image forming apparatus 2 according to the present embodiment configured as described above is explained. FIG. 16 is a flowchart showing a procedure of the patch-image generating process according to the third embodiment.

First, the patch-image generating unit 310 sets a distance L9 between same tone patches in 3C-gray patch sets (first patch sets) of mixed-color patch sets to around half the length of an uneven density period (Step S31). Then, the patch-image generating unit 310 sets a distance L8 between same tone patches in secondary-color patch sets (second patch sets) of the mixed-color patch sets to a value smaller than the distance L9 (Step S32).

Then, the patch-image generating unit 310 sets a distance L1 between same tone patches in single-color patch sets to a value smaller than the distance L8 (Step S33).

Then, the patch-image generating unit 310 arranges the 3C-gray patch sets at an interval of L9 on an area for one page in the memory, such as the RAM 7 (Step S34). Then, the patch-image generating unit 310 arranges the secondary-color patch sets at an interval of L8 on the area for one page in the memory, such as the RAM 7 (Step S35).

And then, the patch-image generating unit 310 arranges the single-color patch sets at an interval of L1 in between the mixed-color patch sets on the area for one page in the memory (Step S36). As a result, a patch image for one page is generated on the memory.

Then, the generated patch image is printed out on a printing sheet by the laser 306 (the engine unit 4) (Step S37).

In this manner, in the present embodiment, mixed-color patch sets are generated so that the mixed-color patch sets are divided into 3C-gray patch sets and secondary-color patch sets and a distance between same tone patches in the 3C-gray patch sets is closer to (N+½) times the length of an uneven density period (N is an integer of 0 or greater) than a distance between same tone patches in the secondary-color patch sets; therefore, the suppressing effect on uneven density when being averaged can work maximally, especially in 3C gray, and the effect of uneven density in the sub-scanning direction on the page can be suppressed effectively, and further, the number of pages required to output a patch image including the mixed-color patch sets can be reduced.

Fourth Embodiment

In a fourth embodiment, a patch image including two single-color patch sets and two mixed-color patch sets in a patch shadow region is generated. The shadow region here means a region where a tone value of a patch is a predetermined value or higher. On the other hand, a region where a tone value of a patch is less than the predetermined value is referred to as a highlight region.

The patch-image generating unit 310 according to the present embodiment sets a tone of each patch, and arranges patches so that two single-color patch sets and two mixed-color patch sets are included in the shadow region. Then, the patch-image generating unit 310 generates the mixed-color patch sets so that a distance between the same tone patches in the mixed-color patch sets is close to (N+½) times the length of a period of uneven density which periodically occurs in the circumferential direction of the photosensitive drum 421 (N is an integer of 0 or greater), and arranges the single-color patch sets in between the mixed-color patch sets, thereby generating a patch image. Incidentally, the configuration of the image forming apparatus 2 other than the patch-image generating unit 310 is the same as in the first embodiment.

Through experiment, the inventors found that amplitude of uneven density is small in the highlight region and large in the shadow region. Consequently, the patch-image generating unit 310 according to the present embodiment arranges two single-color patch sets and two mixed-color patch sets in the shadow region where suppression of amplitude is highly necessary. Furthermore, if the patch-image generating unit 310 according to the present embodiment arranges one single-color patch set in the shadow region and one mixed-color patch set in the shadow region to be aligned in the main-scanning direction with decreasing the number of patches, the patch sets can be arranged more, efficiently, and that is practical.

Figure 17:
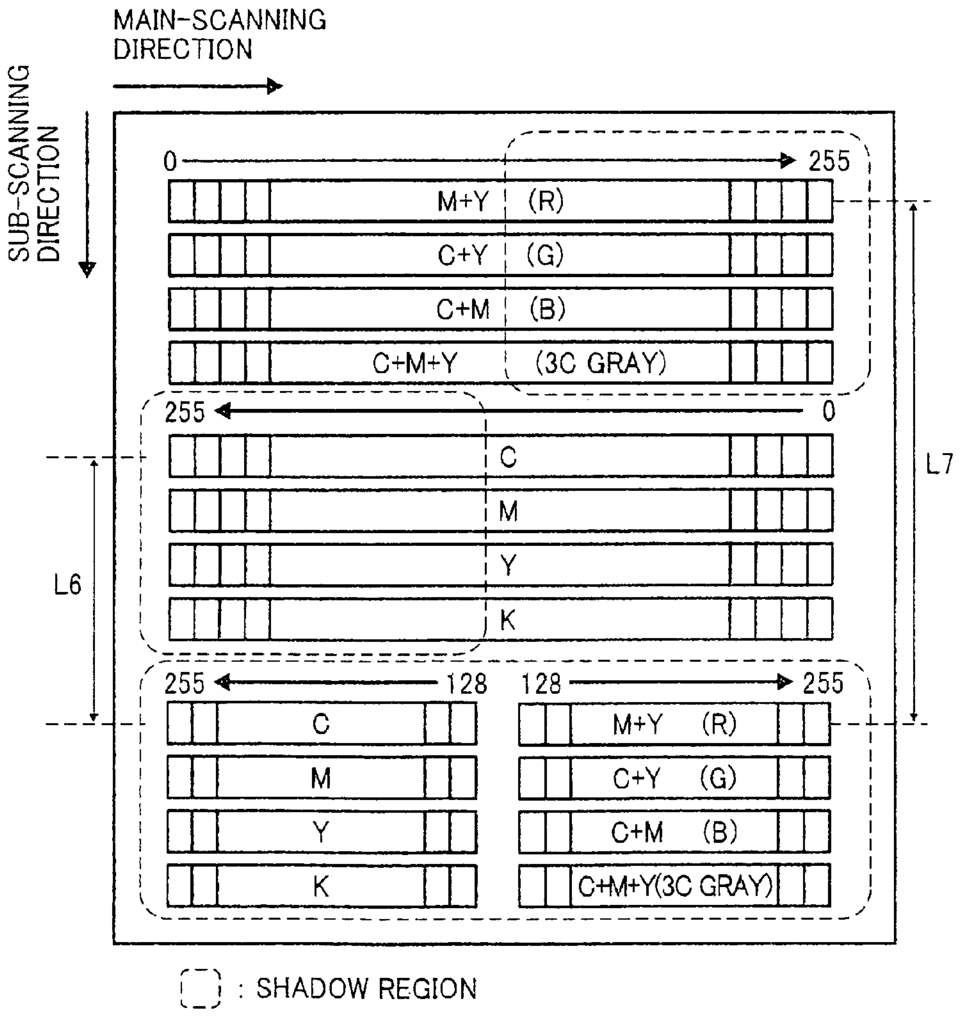
FIG. 17 is a schematic diagram showing an example of a patch image generated by a patch-image generating unit according to a fourth embodiment.

FIG. 17 is a schematic diagram showing an example of a patch image generated by the patch-image generating unit 310 according to the fourth embodiment. In FIG. 17, a portion surrounded by a dotted line is the shadow region. In the example shown in FIG. 17, the predetermined value is set to 128; however, it is not limited to this. Furthermore, in the present example, N is set to zero (N=0).

More specifically, the patch-image generating unit 310 sets a tone of each patch and arranges patches so that two single-color patch sets and two mixed-color patch sets are included in a shadow region and one color patch set out of the single-color patch sets and one color patch set out of the mixed-color patch sets are arranged side by side in the same sub-scanning directional location as shown in FIG. 17. Furthermore, the patch-image generating unit 310 arranges the patch sets so that a distance L7 between same tone patches in the mixed-color patch sets is larger than a distance L6 between same tone patches in the single-color patch sets and also the distance L7 is close to half the length of an uneven density period.

This way, amplitude of uneven density especially in the shadow region of the mixed-color patch set can be maximally suppressed by averaging, and amplitude of uneven density in the shadow region of the single-color patch set can also be suppressed.

Figure 18:
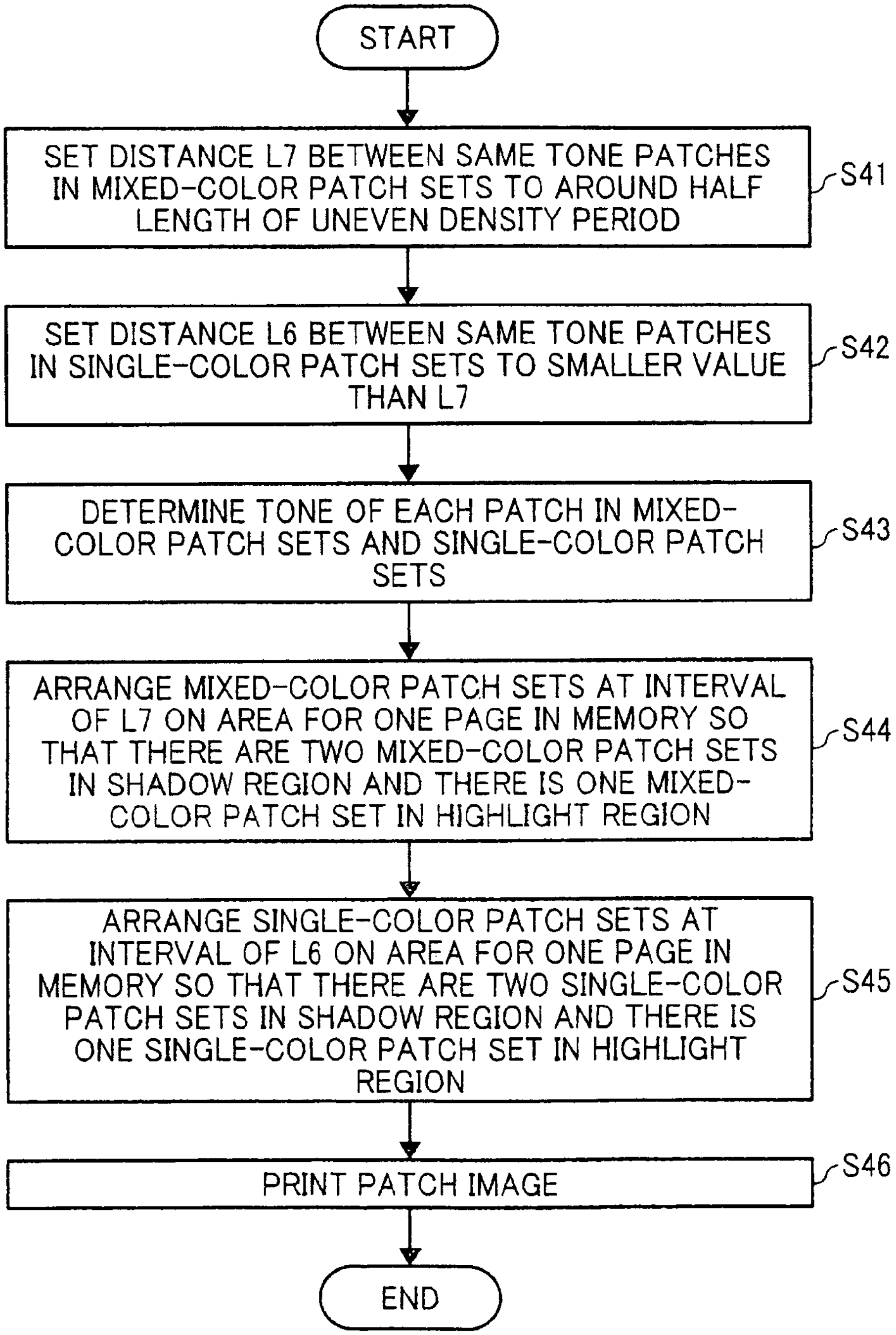
FIG. 18 is a flowchart showing a procedure of a patch-image generating process according to the fourth embodiment.

Subsequently, a patch-image generating process performed by the image forming apparatus 2 according to the present embodiment configured as described above is explained. FIG. 18 is a flowchart showing a procedure of the patch-image generating process according to the fourth embodiment.

First, the patch-image generating unit 310 sets a distance L7 between same tone patches in mixed-color patch sets to around half the length of an uneven density period (Step S41). Then, the patch-image generating unit 310 sets a distance L6 between same tone patches in single-color patch sets to a value smaller than the distance L7 (Step S42). Then, the patch-image generating unit 310 determines a tone of each patch in the mixed-color patch sets and the single-color patch sets (Step S43).

Then, the patch-image generating unit 310 arranges the mixed-color patch sets at an interval of L7 on an area for one page in the memory, such as the RAM 7, so that there are two mixed-color patch sets in a shadow region and there is one mixed-color patch set in a highlight region (Step S44).

And then, the patch-image generating unit 310 arranges the single-color patch sets at an interval of L6 on the area for one page in the memory, such as the RAM 7, so that there are two single-color patch sets in a shadow region and there is one single-color patch set in a highlight region (Step S45). As a result, a patch image for one page is generated on the memory.

Then, the generated patch image is printed out on a printing sheet by the laser 306 (the engine unit 4) (Step S46).

In this manner, in the present embodiment, a patch image including two single-color patch sets and two mixed-color patch sets in a patch shadow region is generated; therefore, while suppressing amplitude of uneven density in the shadow region of the mixed-color patch sets maximally by averaging and also suppressing amplitude of uneven density in the shadow region of the single-color patch sets, the number of pages required to output the patch image including the mixed-color patch sets can be reduced.

Fifth Embodiment

In the first to fourth embodiments, with emphasis on suppression of uneven density of mixed-color patch sets, a patch image in which same tone patches in the mixed-color patch sets are arranged to be kept at a distance in the sub-scanning direction so that a distance between same tone patches in the mixed-color patch sets corresponds to half the length of an uneven density period is generated. In a fifth embodiment, mixed-color patch sets and single-color patch sets are arranged with emphasis on suppression of uneven density of the single-color patch sets in a specific tone range, thereby generating a patch image.

The patch-image generating unit 310 according to the present embodiment sets a tone of each patch in single-color patch sets so that a distance between same tone patches in the single-color patch sets is close to (N+½) times the length of an uneven density period (N is an integer of 0 or greater) and arranges the single-color patch sets in a shadow region where a tone value of a patch is a predetermined value or higher, and further set a tone of each patch in mixed-color patch sets so that a distance between same tone patches in the mixed-color patch sets is close to (N+½) times the length of an uneven density period(N is an integer of 0 or greater) and arranges the mixed-color patch sets in a highlight region where a tone value of a patch is less than the predetermined value, thereby generating a patch image. Incidentally, the configuration of the image forming apparatus 2 other than the patch-image generating unit 310 is the same as in the first embodiment.

Figure 19:
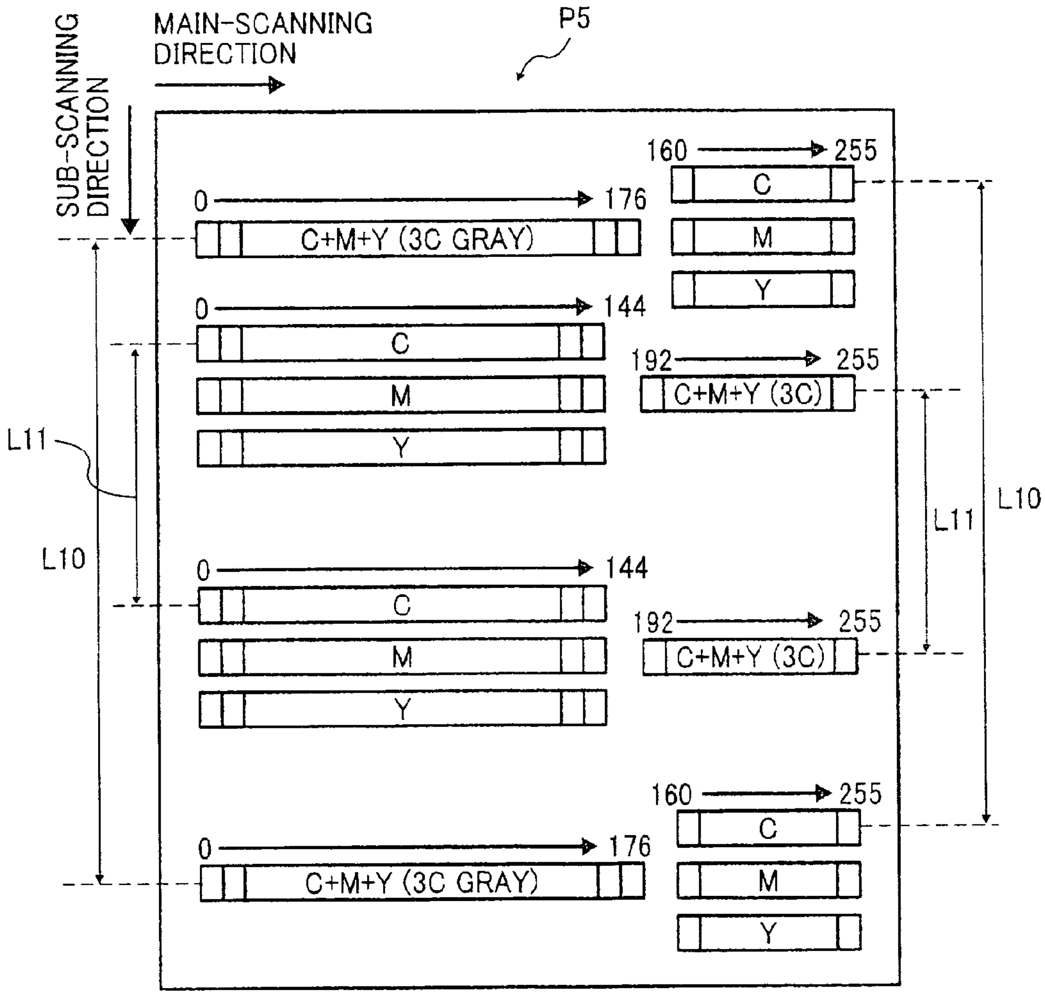
FIG. 19 is a schematic diagram showing an example of a patch image generated by a patch-image generating unit according to a fifth embodiment.

FIG. 19 is a schematic diagram showing an example of a patch image generated by the patch-image generating unit 310 according to the fifth embodiment.

In the present embodiment, as shown in FIG. 19, the patch-image generating unit 310 arranges patches in the highlight region so that a distance L10 between same tone patches in the mixed-color patch sets each consisting of a 3C-gray patch formed of C, M, and Y (C+M+Y) color materials is closer to (N+½) times the length of the uneven density period and a distance L11 between same tone patches in the single-color patch sets is shorter than the distance L10.

On the other hand, as shown in FIG. 19, the patch-image generating unit 310 arranges patches in the shadow region so that a distance between same tone patches in the single-color patch sets is close to the distance L10 and a distance between same tone patches in the mixed-color patch sets each consisting of a 3C-gray patch formed of the three color materials is set to the distance L11 shorter than the distance L10.

Incidentally, in the present embodiment, a value of around 170 is used as the predetermined value; however, it is not limited to, this. Furthermore, in the present example, N is set to zero (N=0).

There is already known the conventional technology to create a gray-focused tone correction table for adjusting 3C gray to a preset target and a single-color-focused tone correction table for adjusting single color to a preset target and merge the two tone correction tables weighted depending on the tone thereby creating a final tone correction table.

For example, a tone-correction-curve creating method disclosed in Japanese Patent No. 3926698, halftone lays a greater weight on a gray-focused tone correction table; highlight and shadow lay a greater weight on a single-color-focused tone correction table with emphasis on halftone dot reproducibility.

Furthermore, even in highlight, gray may be emphasized more than the halftone dot reproducibility; however, as for shadow, a total volume of color materials may go beyond the total volume control. In such a case, even if shadow is adjusted to target 3C gray, it is not actually used in output of a natural image or the like, resulting in few advantages; so, shadow is adjusted to a target of single-color patch sets (or secondary-color patch sets of mixed-color patch sets).

In FIG. 19 described above, when the total value control is set to 200% (255×2.0=510), a reproducible range of 3C gray (C=M=Y) is C=M=Y=170 (510/3=170). Therefore, under the assumption that composition is made so that emphasis on gray is switched to emphasis on single color at a tone value of around 170, the patch-image generating unit 310 arranges patches in a range of highlight to intermediate density, such as patches with tone values of 0 to around 170, so that the distance L10 between same tone patches in the mixed-color patch sets, i.e., 3C-gray patch sets is half the length of the uneven density period. Furthermore, the patch-image generating unit 310 arranges patches in the shadow, i.e., patches with tone values of around 170 to 255 so that the distance (=L10) between same tone patches in the single-color patch sets is half the length of the uneven density period (L10>L11, L11 is a distance between 3C-gray patches in the shadow and a distance between same single-color tone patches in the range of highlight to intermediate density, etc.).

When 17-step tone patches with tone values of 0, 16, 32, 48, 64, 80, 96, 112, 128, 144, 160, 176, 192, 208, 224, 240, and 255 in each color are arranged, the tone values of 160 and 176 or around is a boundary along which emphasis on gray is switched to emphasis on single color. In this way, single-color patch sets and mixed-color patch sets are arranged and averaged, and used for creation of a tone correction table, so that a merged tone correction table can be a higher-precision tone correction table which suppresses the effect of uneven density.

Figure 20:
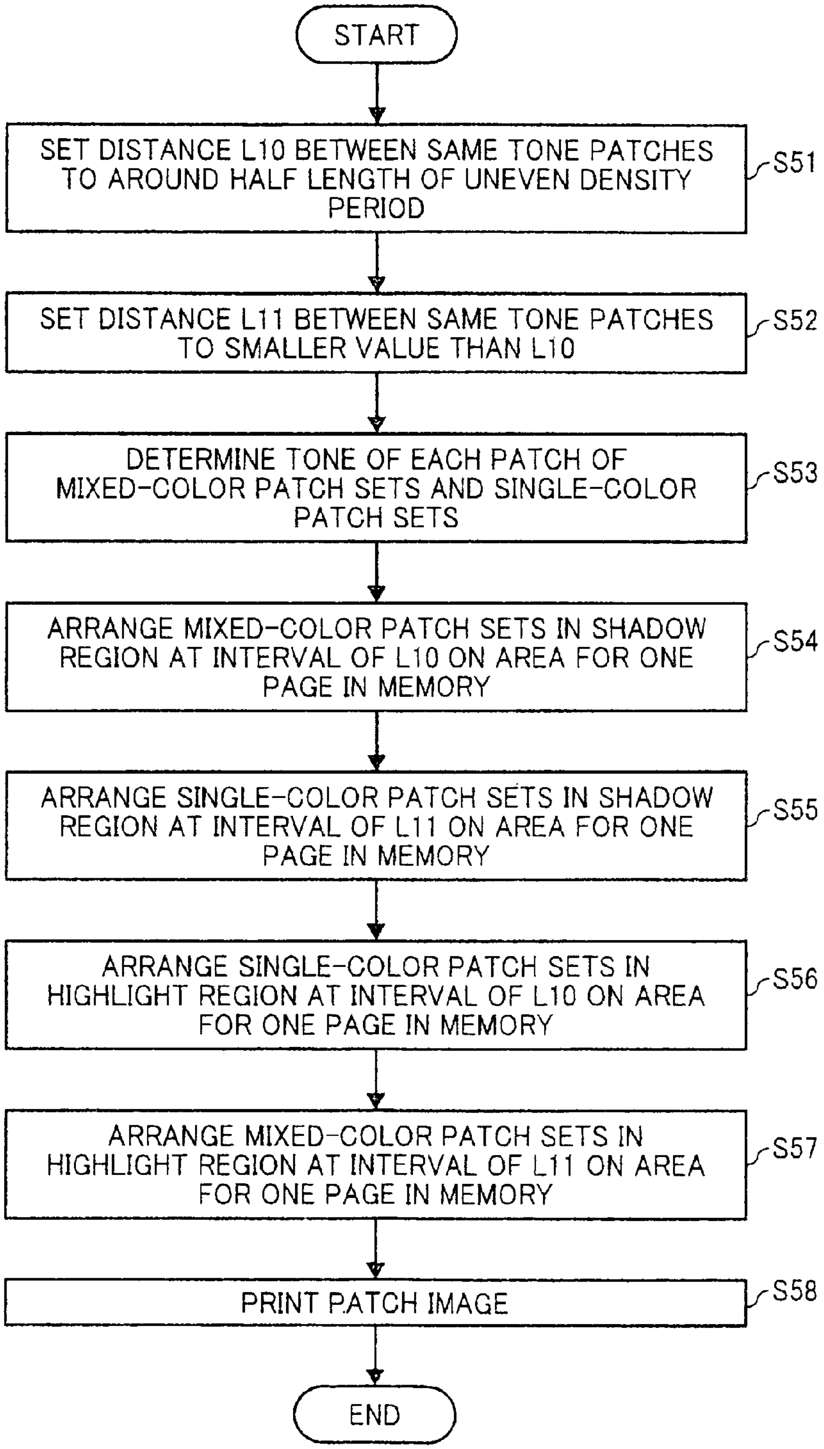
FIG. 20 is a flowchart showing a procedure of a patch-image generating process according to the fifth embodiment.

Subsequently, a patch-image generating process performed by the image forming apparatus 2 according to the present embodiment configured as described above is explained. FIG. 20 is a flowchart showing a procedure of the patch-image generating process according to the fifth embodiment.

First, the patch-image generating unit 310 sets the distance L10 between same tone patches to around half the length of the uneven density period (Step S51). The patch-image generating unit 310 sets the distance L11 between same tone patches to a value smaller than the distance L10 (Step S52). Then, the patch-image generating unit 310 determines a tone of each patch of mixed-color patch sets and single-color patch sets (Step S53).

Then, the patch-image generating unit 310 arranges the mixed-color patch sets in the shadow region at an interval of L10 on an area for one page in the memory, such as the RAM 7 (Step S54). Then, the patch-image generating unit 310 arranges the single-color patch sets in the shadow region at an interval of L11 on the area for one page in the memory, such as the RAM 7 (Step S55).

Then, the patch-image generating unit 310 arranges the single-color patch sets in the highlight region at an interval of L10 on the area for one page in the memory, such as the RAM 7 (Step S56). Then, the patch-image generating unit 310 arranges the mixed-color patch sets in the highlight region at an interval of L11 on the area for one page in the memory, such as the RAM 7 (Step S57). As a result, a patch image for one page is generated on the memory.

Then, the generated patch image is printed out on a printing sheet by the laser 306 (the engine unit 4) (Step S58).

In this manner, in the present embodiment, with emphasis on suppression of uneven density of single-color patch sets in a specific tone range, mixed-color patch sets and the single-color patch sets are arranged, thereby generating a patch image; therefore, a higher-precision tone correction table which suppresses the effect of uneven density can be obtained, and as a result, the effect of uneven density in the sub-scanning direction on the page can be suppressed more effectively, and the number of pages required to output the patch image including the mixed-color patch sets can be reduced.

Incidentally, respective image forming programs executed by the image forming apparatuses 2 according to the first to fifth embodiments are each built into the ROM or the like in advance.

Alternatively, each of the image forming programs executed by the image forming apparatuses 2 according to the first to fifth embodiments can be stored in a computer-readable recording medium, such as a CD-ROM, a flexible disk (FD), a CD-R, or a digital versatile disk (DVD), in an installable or executable file format so as to provide the recording medium.

Furthermore, each of the image forming programs executed by the image forming apparatuses 2, according to the first to fifth embodiments can be stored on a computer connected to a network, such as the Internet, so that the image forming program can be provided by causing a user to download it via the network. Moreover, each of the image forming programs executed by the image forming apparatuses 2 according to the first to fifth embodiments can be provided or distributed via a network such as the Internet.

Each of the image forming programs executed by the image forming apparatuses 2 according to the first to fifth embodiments is composed of modules including the above-described units (the color separation unit, the gamma correction unit, the screening/halftone processing unit, and the patch-image generating unit). The CPU (processor) as actual hardware reads out the image forming program from the ROM, and executes the image forming program, thereby loading the above units on the main memory, and the color separation unit, the gamma correction unit, the screening/halftone processing unit, and the patch-image generating unit are generated on the main memory.

As described above, the image forming apparatuses 2 according to the first to fifth embodiments are useful in calibration for correcting the density, and particularly suitable for mixed-color calibration.

According to the embodiments, the effect of uneven density in the sub-scanning direction on the page can be suppressed effectively, and the number of pages required to output a patch image including mixed-color patch sets can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that transfers an image formed on a photosensitive element onto a recording medium, the image forming apparatus comprising:

a patch-image generating unit configured to generate a patch image for measuring a color reproduction characteristic and correcting color, the patch image includes mixed-color patch sets each including a plurality of patches each formed by overlaying a plurality of color materials, patches having the same color and the same tone value included in the mixed-color patch sets are arranged away from each other in a circumferential direction of the photosensitive element, and a distance between same tone patches, which are two patches having the same color and the same tone value, included in the mixed-color patch sets is close to (N+½) times the length of a period of uneven density which periodically occurs in the circumferential direction of the photosensitive element (N is an integer equal to or greater than 0); and an image forming unit configured to form the generated patch image on the recording medium, wherein the patch image includes single-color patch sets each including a plurality of patches each formed of a single color material, and the single-color patch sets are arranged between the mixed-color patch sets.

2. The image forming apparatus according to claim 1, wherein the patch-image generating unit is configured to generate the patch image by dividing the mixed-color patch sets into first patch sets each consisting of a patch formed of predetermined number of color materials or more and second patch sets each consisting of a patch formed of less than the predetermined number of color materials, and by arranging the mixed-color patch sets so that a distance between same tone patches in the first patch sets is closer to (N+½) times the length of the period of uneven density (N is an integer equal to or greater than 0 ) than a distance between same tone patches in the second patch sets.

3. The image forming apparatus according to claim 1, wherein the patch-image generating unit separates the single-color patch sets each including a plurality of patches each formed of a single color material into a plurality of groups by color, and arranges the single-color patch sets in between the mixed-color patch sets so that a distance between same tone patches of each group differs from group to group to generate the patch image.

4. The image forming apparatus according to claim 1, wherein the patch-image generating unit is configured to generate the patch image by setting a tone of each patch and arranging the patches so that a shadow region, where a tone value of a patch is a predetermined value or higher, includes two single-color patch sets each including a plurality of patches each formed of a single color material and two mixed-color patch sets.

5. The image forming apparatus according to claim 1, wherein the patch-image generating unit is configured to generate the patch image by setting a tone of each patch, and arranging patch sets so that in a shadow region, where a tone value of a patch is a predetermined value or higher, a distance between same tone patches in single-color patch sets each including a plurality of patches each formed of a single color material is close to (N+½) times the length of the period of uneven density (N is an integer equal to or greater than 0), and in a highlight region, where a tone value of a patch is less than the predetermined value, a distance between same tone patches in the mixed-color patch sets is close to (N+½) times the length of the period of uneven density (N is an integer equal to or greater than 0.

6. An image forming method executed by an image forming apparatus that transfers an image formed on a photosensitive element onto a recording medium, the image forming method comprising:

generating a patch image for measuring a color reproduction characteristic and correcting color, the patch image including mixed-color patch sets each including a plurality of patches each formed by overlaying a plurality of color materials, patches having the same color and the same tone value included in the mixed-color patch sets are arranged away from each other in a circumferential direction of the photosensitive element, and a distance between same tone patches, which are two patches having the same color and the same tone value, included in the mixed-color patch sets is close to (N+½) times the length of a period of uneven density which periodically occurs in the circumferential direction of the photosensitive element (N is an integer equal to or greater than 0) and forming the generated patch image on the recording medium, wherein the patch image includes single-color patch sets each including a plurality of patches each formed of a single color material, and the single-color patch sets are arranged between the mixed-color patch sets.

7. A program executed by a computer that transfers an image formed on a photosensitive element onto a recording medium, the program causing the computer to execute:

generating a patch image for measuring a color reproduction characteristic and correcting color, the patch image including mixed-color patch sets each including a plurality of patches each formed by overlaying a plurality of color materials, patches having the same color and the same tone value included in the mixed-color patch sets are arranged away from each other in a circumferential direction of the photosensitive element, and a distance between same tone patches, which are two patches having the same color and the same tone value, included in the mixed-color patch sets is close to (N+½) times the length of a period of uneven density which periodically occurs in the circumferential direction of the photosensitive element (N is an integer equal to or greater than 0); and forming the generated patch image on the recording medium, wherein the patch image includes single-color patch sets each including a plurality of patches each formed of a single color material, and the single-color patch sets are arranged between the mixed-color patch sets.

* * * * *